United States Patent [19]
Sensel et al.

[11] Patent Number: 6,091,714
[45] Date of Patent: Jul. 18, 2000

[54] PROGRAMMABLE DISTRIBUTED DIGITAL SWITCH SYSTEM

[76] Inventors: Steven D. Sensel, 8350 CR 666, Blue Ridge, Tex. 75424; Edgar L. Read, 3520 Melanie La., Plano, Tex. 75023; Brian Keith Berger, 7101 Chase Oak Blvd., No. 1915, Plano, Tex. 75025

[21] Appl. No.: 08/853,041

[22] Filed: Apr. 30, 1997

[51] Int. Cl.[7] .............................. H04L 12/16; H04L 12/28
[52] U.S. Cl. ......................... 370/260; 370/266; 370/420; 370/261; 370/263
[58] Field of Search ..................................... 370/260, 261, 370/262, 263, 264, 266, 420, 421, 463, 419; 348/15; 379/202, 203, 204, 205, 206

[56] References Cited

U.S. PATENT DOCUMENTS

| | | | |
|---|---|---|---|
| 5,305,312 | 4/1994 | Fornek et al. | 370/264 |
| 5,347,516 | 9/1994 | Yoshida | 370/420 |
| 5,604,738 | 2/1997 | Shibata et al. | 370/264 |
| 5,619,556 | 4/1997 | Richardson, Jr. et al. | 379/202 |
| 5,812,535 | 9/1998 | Hallock et al. | 370/264 |
| 5,822,306 | 10/1998 | Catchpole | 370/263 |

*Primary Examiner*—Hassan Kizou
*Assistant Examiner*—Hanh Nguyen
*Attorney, Agent, or Firm*—Gregory M. Howison

[57] ABSTRACT

A distributed digital switching system is provided that includes a plurality of service controllers (20) which are interconnected to each other through a network (10). A network arbitrator is provided that controls the flow of traffic on the network (10). Each of the service controllers (20) is operable to provide a switching configuration between inbound data to the service controller (20) and network terminations associated with each of the service controllers (20). A processor (150) on each of the service controllers (20) controls the operations thereof with the voice information stored in a memory (208) which can be configured with a circuit (204). Each of the service controllers (20) has associated therewith a conference circuit for defining and creating a conference that can access all inbound data and provide interconnections therebetween and output this on a single outbound conference channel. There can be multiple conferences created at each service controller (20). Each of the conferences on the network can be accessed with a single associated conference address, such that only one address need be defined on the network for a given conference.

26 Claims, 13 Drawing Sheets

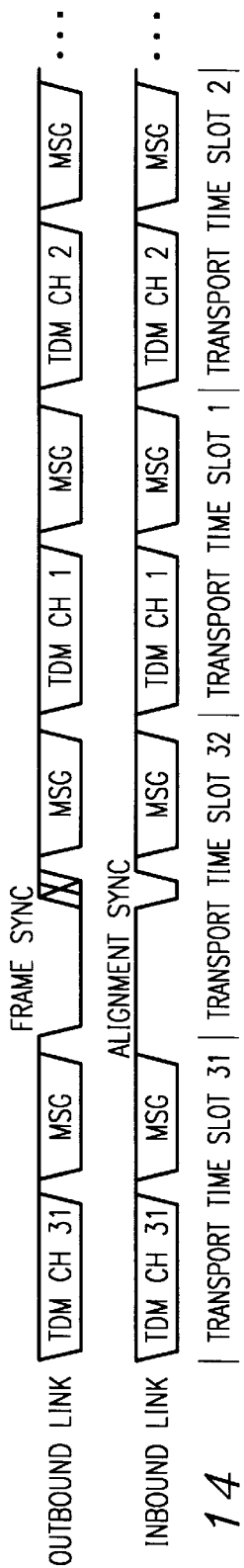
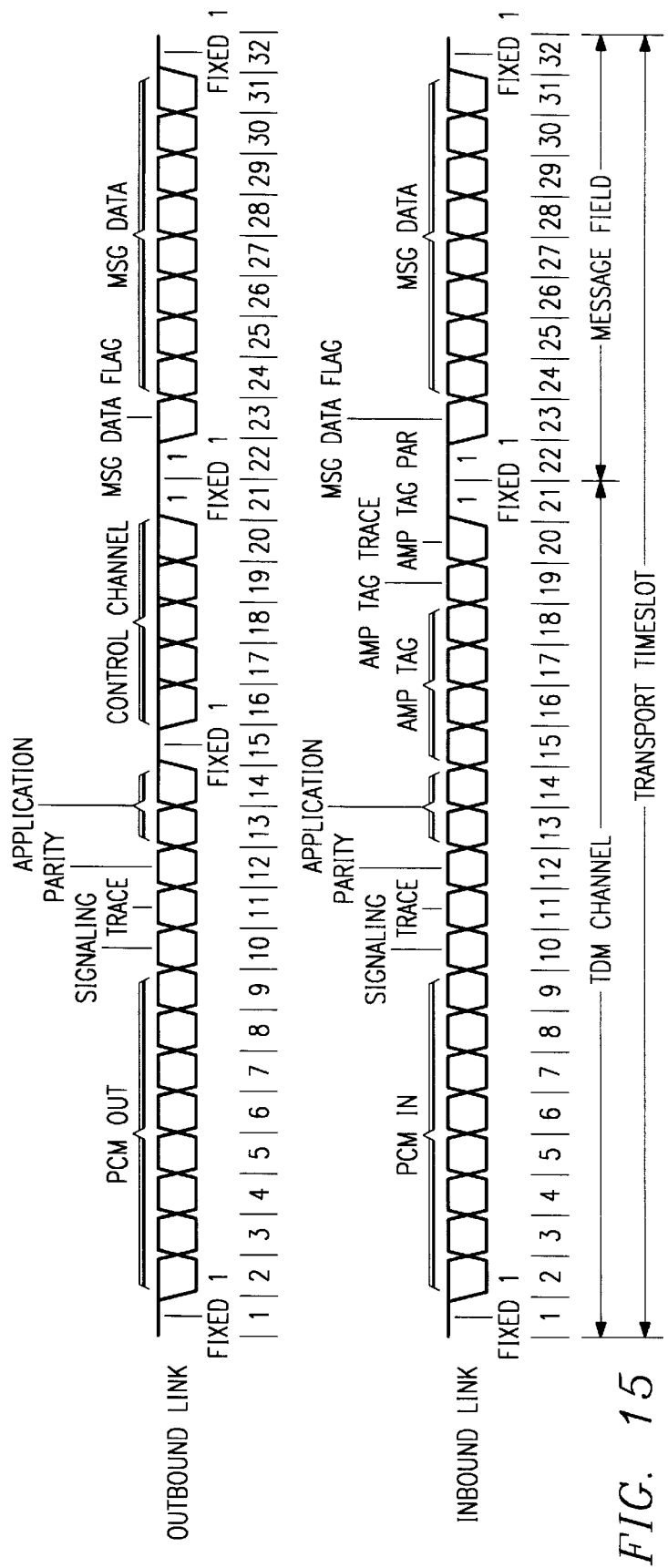
FIG. 14
FIG. 15

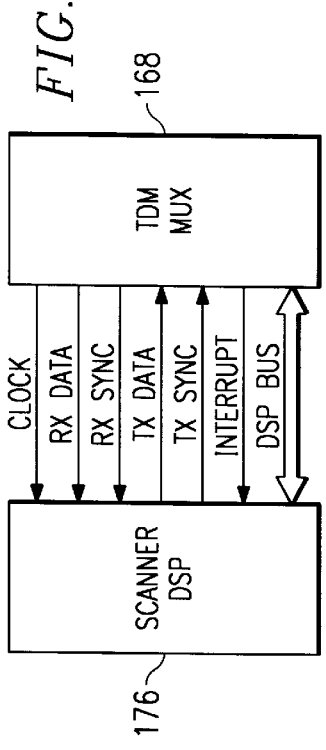

6,091,714

PROGRAMMABLE DISTRIBUTED DIGITAL SWITCH SYSTEM

TECHNICAL FIELD OF THE INVENTION

The present invention pertains in general to digital telecommunication switches and, more particularly, to a digital switching system that utilizes distributed processing at various switching nodes.

BACKGROUND OF THE INVENTION

Various digital switching schemes for controlling the flow of digital communications information have incorporated such things as "programmable switches." In general, most programmable switches involve some type of centralized network that allows various nodes to interface with each other. These conventional switches are oriented around a host platform that possesses all of the feature execution, while the switch itself possesses only the ability to execute primitive-level functions that in and of themselves are not visible to any user as a feature or a function. For these host-based systems, host software is required during the execution for the call at all stages. The reason for this is that the manufacturer of the switch has designed the switch to place all responsibility and opportunity to dictate how a call is handled with the purchaser of the switch. In systems that existed prior to the host-based systems, the manufacturer provided all software while making the purchaser dependent on the manufacturer's ability to produce. Time-to-market and expenses associated with the manufacturer were reduced substantially by allowing the purchaser to produce the software itself. In general, the host-based system has a number of problems. These problems are, in part, related to issues of performance, cost and the level of programmability of the switch. The older programmable switches are more expensive than their non-programmable counterparts (measured in terms of cost-per-channel). The size of the switches tended to be smaller than performance levels that are useful. The level of programmability has been a problem due to the fact that the purchaser has been required to choose from either having no high-level software for call and maintenance functions (since the manufacturer has only provided basic call primitive-level functionality-features) or to resort to third-party suppliers that provide middleware and call functionality that is not as programmable as a switch and adds substantially to the cost.

SUMMARY OF THE INVENTION

The present invention disclosed and claimed herein comprises a conferencing system for servicing a plurality of network terminations. The conferencing system includes a main network having a plurality of network channels for carrying network information. A network memory is provided and associated with each of the network terminations for storing the network information for all of the network channels. A plurality of conference circuits are provided, each associated with select ones of the network terminations. The conference circuits are each operable to create a conference for an associated one of the network terminations such that each of the network terminations has a dedicated conference associated therewith. The conference defines the ones of the network channels that are accessible by the associated network termination in the associated conference. A sorter is associated with each network termination and the associated conference for selecting ones of the accessible network channels defined by the associated conference from the associated network memory in accordance with an associated sorting algorithm. A summing circuit then sums selected ones of accessible network channels for output to the network termination.

In another aspect of the present invention, each of the network terminations has associated therewith an inbound channel which comprises an interconnection for interconnecting the inbound channel to the network. This inbound channel comprises the network information when all the inbound channels are routed to the network.

In a further aspect of the present invention, the network memory comprises a plurality of network memories, each associated with a plurality of the network terminations. The plurality of conference circuits are configured such that there is a select conference circuit for each of the network memories for creating conferences for each of the associated network terminations.

In a yet further aspect of the present invention, the sorting algorithms are substantially identical for each of the conferences created by the conference circuit. The sorting algorithm utilizes amplitude as a criteria for the associated sorting algorithm. To facilitate this, the network information includes both voice information and amplitude information with the amplitude information provided for each of the channels. The sorter then accesses the amplitude information for sorting thereon.

BRIEF DESCRIPTION OF THE DRAWINGS

For a more complete understanding of the present invention and the advantages thereof, reference is now made to the following description taken in conjunction with the accompanying Drawings in which:

FIG. 14 illustrates the transport format for a network TDM link;

FIG. 15 illustrates the format for the transport time slot;

FIG. 16 illustrates a detailed block diagram of the scanner DSP and TDM MUX;

FIG. 17. Illustrates a diagram of a typical MSG channel segment sequence;

FIG. 18 illustrates the format for the message segment;

DETAILED DESCRIPTION OF THE INVENTION

Figure 1:
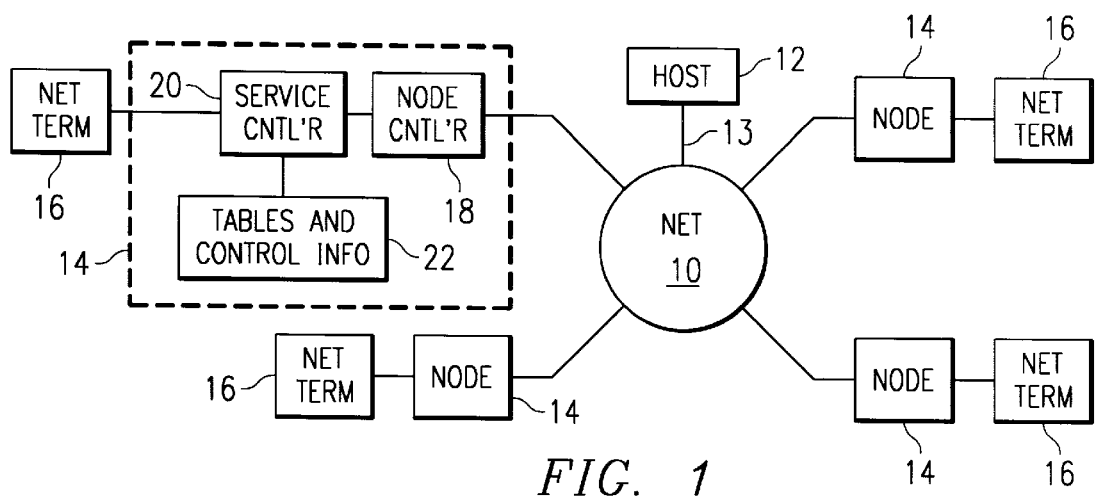
FIG. 1 illustrates a diagrammatic view of the overall switching system.

Referring now to FIG. 1, there is illustrated a diagrammatic view of an overall network incorporating the peer-based flat distributed architecture of the present invention. A network 10 is provided, which, in the preferred embodiment, can incorporate in part, a fiber optics network which has associated therewith a host 12 that interfaces with the network 10 through an Ethernet connection 13. Attached to the network 10 are a plurality of switching nodes 14. Each of the switching nodes 14 is connected to one or more of network terminations 16. Each of the network termination 16 can be a T1-related device, an ISDN-related device or general analog line.

Of the illustrated network nodes 14, only one of the network nodes 14 is illustrated in detail. This network node 14 includes a node controller 18, which is operable to interface directly with the network 10 on one side to access the host 12 on one side through Ethernet portion of the network and the other nodes 14 through the fibre optic portion of the network 10 and, on the other side thereof, with a service controller 20. The service controller 20 is operable to service one or more of network terminations 16 and allow information to be transported between network termination 16 and the network 10. The service controller 20 has associated therewith tables and control information stored in a memory block 22. Some of this information is utilized to allow a particular node 14 to control itself Since this is a "flat" architecture or a peer-based system, each node 14 has control of the information it sends to the network and the information it receives from the network.

As will be described in more detail hereinbelow, one feature that the system of FIG. 1 incorporates is a conference feature. This conference feature allows information to be transmitted to the "network" and also receive information therefrom. Whenever a conference is in effect, one of the network terminals 14 can initiate a call. This is facilitated by transmitting message information over the network 10 with a "call address." Thereafter, each of the other nodes 14 can enter this conference by merely accessing that particular call address. A conference bridge is incorporated on each of the nodes in the service controller 20 to receive the voice information over an information portion of the network 10. All of the voice information is receivable at each of the nodes 14, with each of the nodes 14 determining what information is to be received. Once a table has been built up at a particular network node 14, then the conference bridge is configured to receive the basic voice information and convert it into an appropriate signal for transmission to the network terminal 16. Each of the nodes 14 handles a plurality of channels of information. If one of the network channels drops out of the network, it is only necessary then to transmit a message on the particular call address that that particular channel is dropping out of the call and each of the network nodes 14 still in the conference can then reconfigure their tables and reconfigure their conference bridge. Therefore, it is only necessary to access a particular call address on the network in order to enter a conference, the details of which will be described in more detail hereinbelow. As will also be described hereinbelow, the conference bridge at each of the nodes 14 is operable to build a conference for each network channel associated with the associated network termination(s) 16.

As noted above, the network 10 is comprised of two portions, an information portion and a message portion. The message portion is provided for carrying command information and address information over the network, whereas the information portion is operable to carry voice information in one embodiment. Of course, in another embodiment, video information could be carried.

System Architecture

Figure 2:
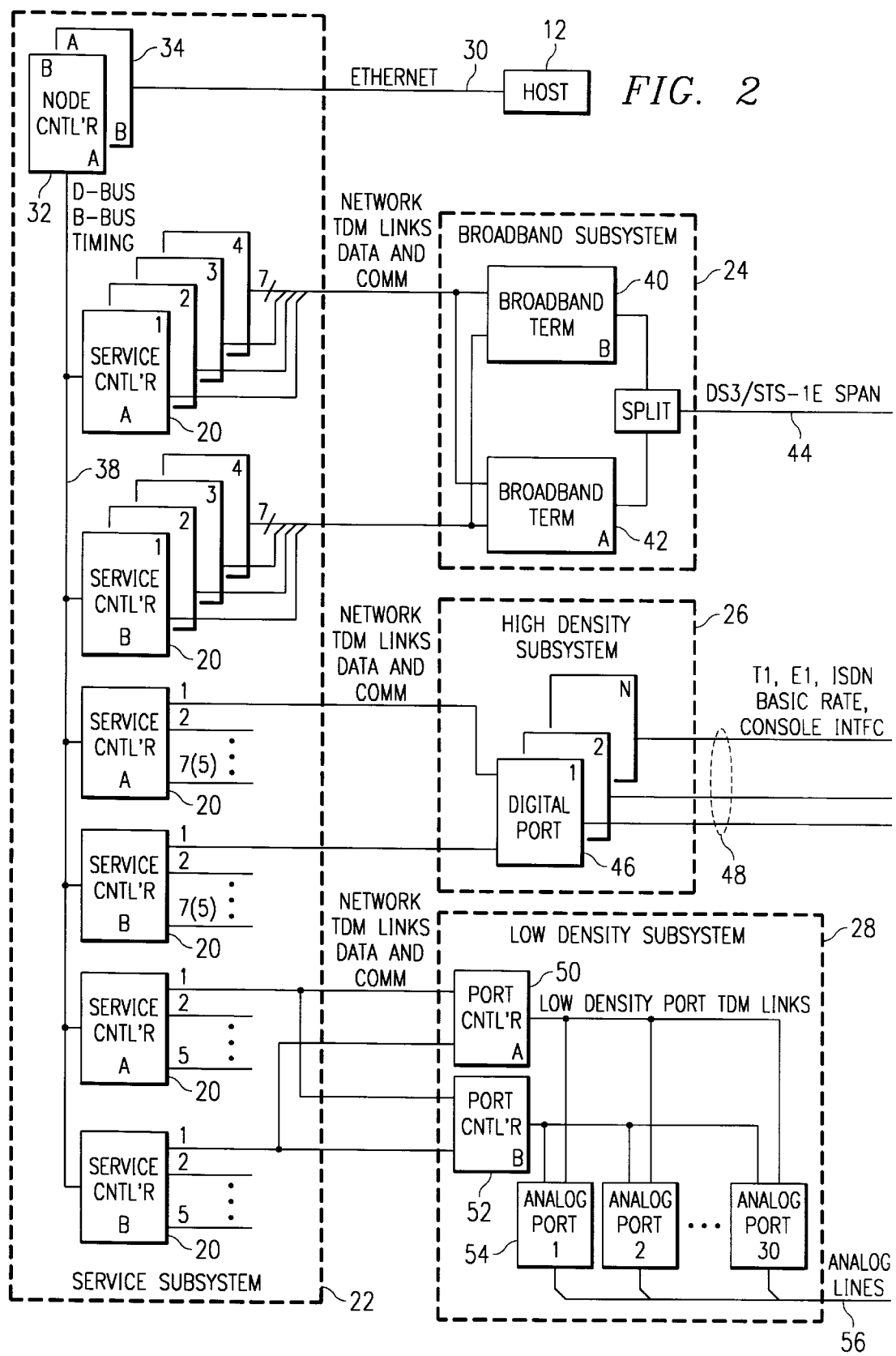
FIG. 2 illustrates a block diagram of a switching node.

Referring now to FIG. 2, there is illustrated a more detailed diagram of one of the network nodes 14. The switching node is generally comprised of two subsystems, a single-service subsystem 22 and a number of interface subsystems which allow the various network TDM links to be interfaced with various network terminations. There are three illustrated, a broadband subsystem 24, a high-density subsystem 26 and a low-density subsystem 28. The host 12 is interfaced through an Ethernet cable 30 to a node controller 32, similar to the node controller 18 of FIG. 1, and a node controller 34, also similar to node controller 18. Node controllers 32 and 34 are identical with the exception that the node controller 32 is a redundant node controller. The node controllers 32 and 34 reside at top of the switching node 14 hierarchy.

The node controllers 32 and 34 interface with a plurality of the service controllers 20 through various data, information and timing buses 38. These buses 38 are connected to a plurality of service controllers 20. The buses 38 are comprised of a communications transport bus, sometimes referred to as a "delta-bus" or a "D-Bus," a bearer-channel transport bus (B-Bus) and a timing distribution bus. The opposite side of each of the service controllers 20 is comprised of network TDM links for both data and communication, which will carry communication data, bearer channels (B-CHNL) and timing signals.

As illustrated in FIG. 2, the service controllers 20 are interfaced with the broadband subsystem 24. The broadband subsystem is comprised of two broadband terminations 40 and 42, which interface with a broadband network termination on link 44. It is noted that four service controllers 20 are required for each TDM network link to the broadband subsystem 24. There are required two service controllers 20 interfacing with the high-density subsystem 26, having a plurality of digital ports 46 associated therewith. These are interfaced with T1 and E1 digital terminations through communication lines 48. Two of the service controllers 20 are interfaced with the low-density subsystem 28 through their associated TDM links, wherein they are input to port controllers 50 and 52 which in turn are interfaced with analog ports 54. These analog ports 54 then interface with analog trunk terminations on communication link 56.

Figure 3:
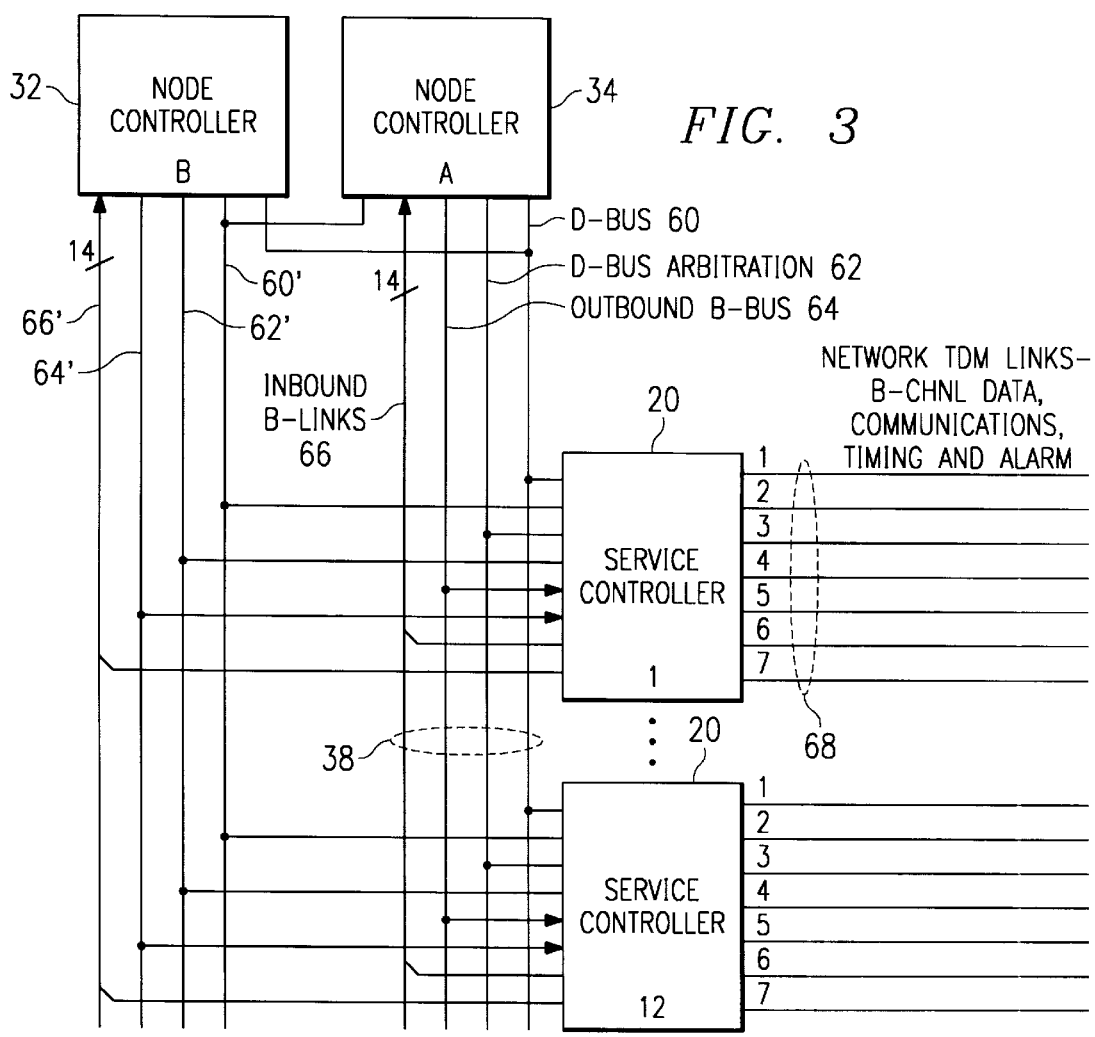
FIG. 3 illustrates a more detailed block diagram of the service subsystem.

Referring now to FIG. 3, there is illustrated a more detailed block diagram of the service subsystem 22. The node controller 34 has associated therewith a D-Bus 60, a D-Bus arbitration bus 62, an outbound B-Bus 64 and an inbound B-Link bus 66. The node controller 32 has associated therewith copies of the D-Bus 60, the D-Bus arbitration bus 62, the outbound B-Bus 64 and the inbound B-Link bus 66 in the form of a D-Bus 60', a D-Bus arbitration bus 62', an outbound B-Bus 64' and an inbound B-Link bus 66'. This essentially comprises the buses 38. The output of each of the service controllers 20 comprises seven time domain multiplex (TDM) ports 68, which are output from an internal TDM multiplexer. These essentially carry the B-CHNL data, communications, timing information and alarm information.

The node controllers 32 and 34 essentially occupy the top of the switching node hierarchy and perform the operations of node maintenance and timing distribution functions. The primary functions provided by the node controllers are node maintenance and fault recovery, network synchronization, system timing distribution, D-Bus arbitration, global conference identification (GCI) allocation, alarm reporting interface and host processor interface (Ethernet). The service controllers 20 each include conference circuits for conferencing B-CHNLs and also for switching channels to network connections. All processing software resides on the service controllers 20 and they will be responsible for maintenance and fault recovery of network termination subsystems to which they are connected. The primary features of the service controllers 20 are for controlling D-Bus access, B-Bus access, conference circuits, voice storage and network connections for the DS0 channels, of which, in the preferred embodiment, there are 168 and two for maintenance functions.

The various communication interfaces between the service controllers 20 and the network termination subsystems are carried out on the multiplexed TDM ports 68. This allows the message information to be carried out on communication channels with the voice information being carried out on the B-CHNLs and other data on network TDM links. All of this is multiplexed on the ports 68. The D-Bus 60 is a bus that is utilized to provide a flat structure such that all node controllers 32 and 34 and the service controllers 20 in this system will have equal access or fair access to the bus. As will be described hereinbelow, the D-Bus 60 is actually divided up into a Main and an Alternate D-Bus, and separate physical media will be provided for the two buses. The Main D-Bus is utilized to transport traffic with relatively low sensitivity to the delay, with two priority levels provided for the main D-Bus. High priority transport will be used for normal maintenance and call-processing traffic, with low priority transport utilized for background functions, such as the transport of packetized voice messages. The Alternate D-Bus will be utilized for traffic that is especially sensitive to delay.

In a given node 14, the Main D-Bus will consist of redundant (A and B), 10-bit wide buses that will support eight data bits, a 9th bit covering the eight data bits and a 10th bit utilized to delimit messages transmitted on the bus. The bus will operate at 8.192 megabytes per second to provide a bandwidth of 64 megabytes per second. The Alternate D-Bus will be similar to the Main D-Bus in structure and access method, but it will utilize a serial transport media and will operate at 8.192 megabits per second. A second conductor associated with the Alternate D-Bus will carry a Busy signal, similar to that provided for the Main D-Bus. Various elements connected to the Main and Alternate D-Buses will arbitrate for transmit access on the selected bus in a round-robin fashion. Arbitration circuits will reside on both copies of the redundant node controllers 32 and 34, the arbitration circuit on the active node controller controlling the arbitration bus for enabling access requests and then issuing a request grant to the selected device. Once an element receives a grant, the associated message will be transmitted on both copies of the D-Bus.

Both node controllers 32 and 34 and the service controllers 20 will have access to the D-Bus 60 for transmitting and receiving messages. Messages transmitted on the buses will be available at receivers on all elements connected to D-Bus 60. An address header at the beginning of each message will be utilized to identify which element or elements are to receive a message. Although messages will be transmitted on both copies of the D-Bus 60 on node controllers 32 and 34 and service controllers 20, they will only be received on the D-Bus copy that is declared to be active for the receiving element.

Each service controller 20 will support seven network TDM links for connection to network termination subsystems. A network TDM link will consist of an outbound TDM link, an inbound TDM link and an outbound clock signal. The direction of transport (inbound and outbound) will be defined with respect to the node controller for single-node systems (wherein nodes 14 are not interconnected with network 10). It should be understood, however, that the description of the single-node system in the present embodiment can be extended to a multi-node system. The inbound and outbound links will operate at 8.192 megabits per second and will carry communications, synchronization and bearer information. An 8.192 MHz clock will be transmitted on the clock signal line for timing circuits in the network termination subsystems. A communication channel will be provided on the network TDM links for transporting communications between the service controllers 20 and devices in the network termination subsystems. A bandwidth of 2.048 megabits per second will be provided in both directions.

The bearer channels will carry nine bits of information per 125 microsecond frame. The channels will have the capacity to carry a 64-kilobit per second DS0 channel, plus one bit that may be utilized for associated signaling or may be utilized to carry higher bandwidth channels, such as SONET VT 1.5 channels. Use of the ninth bit is reserved. The switching mechanisms of the switching node 14 will provide non-blocking access for switching and conferencing the B-CHNLs or groups of B-CHNLs. Switching and conferencing will be accomplished on each of the service controllers 20, with all of the channels in the node available at each service controller 20 to support non-blocking access.

Three basic B-CHNL transport vehicles will be provided, with B-CHNLs transported between service controllers 20 and network termination equipment being carried on the network TDM links described hereinabove. B-CHNLs transported from the service controllers 20 to the node controllers will be carried on serial, point-to-point B-LINKs. B-CHNLs transported from the node controllers to the service controllers will be carried on the multi-drop, parallel B-Bus 64.

The bearer portion of the TDM links 68 will provide a bandwidth capable of supporting thirty-one, 11-bit channels. When connected to T1 termination units, they will carry 24 channels. When connected to E1 terminations, they will carry 30 channels. The number of channels carried by the network TDM links when connected to other types of subsystems will vary depending upon the application. The links will carry 30 channels for applications such as analog ports. Applications such as BRI terminations will utilize 24 channels of the network TDM link capacity.

The separate pair of B-LINKs 66 and 66' are provided for each service controller for transporting B-CHNLs from the service controllers 20 to the node controllers 32 and 34. These will be referred to as a B-LINK A and B-LINK B. BLINK A is referred to as the inbound B-LINK 66 and B-LINK B is referred to as an inbound B-LINK 66' for input to node controller 32. The links 66 and 66' operate at a rate of 16.384 megabytes per second, and will accommodate 170 B-CHNLs. Since the service controllers 20 only support 168 network DS0 channels, two of the channels will be available for use in maintenance routine.

The inbound B-CHNLs from the active B-LINKs will be converted from the serial B-LINK format to a parallel format on the node controllers 32 and 34. The converted channels will then be multiplexed to a parallel B-Bus with channels from other B-LINKs for outbound transport to the service controllers 20 on the B-Bus 64 and 64'. Each one of the node controllers 32 and 34 will provide an independent B-Bus copy. The B-Bus will operate at a rate of 16.384 megabytes per second and will support 2048 channels, and channels from up to twelve B-LINKs will be multiplexed to the bus. The maximum number of channels utilized for network traffic will be 2016 (12×168). Twenty-four channels (12×2) will be available for maintenance routines and the remaining eight channels of the 2048 channels will not be utilized. Those B-Bus copies from the controllers 32 and 34, respectively, will be connected to all of the service controllers 20. Therefore, each service controller 20 will have non-blocking access to all the traffic supported by the node 14. Selected channels may be switched to outbound network channels or may be conferenced to create conference channels to be transported as outbound network channels.

Node Controller

Figure 4:
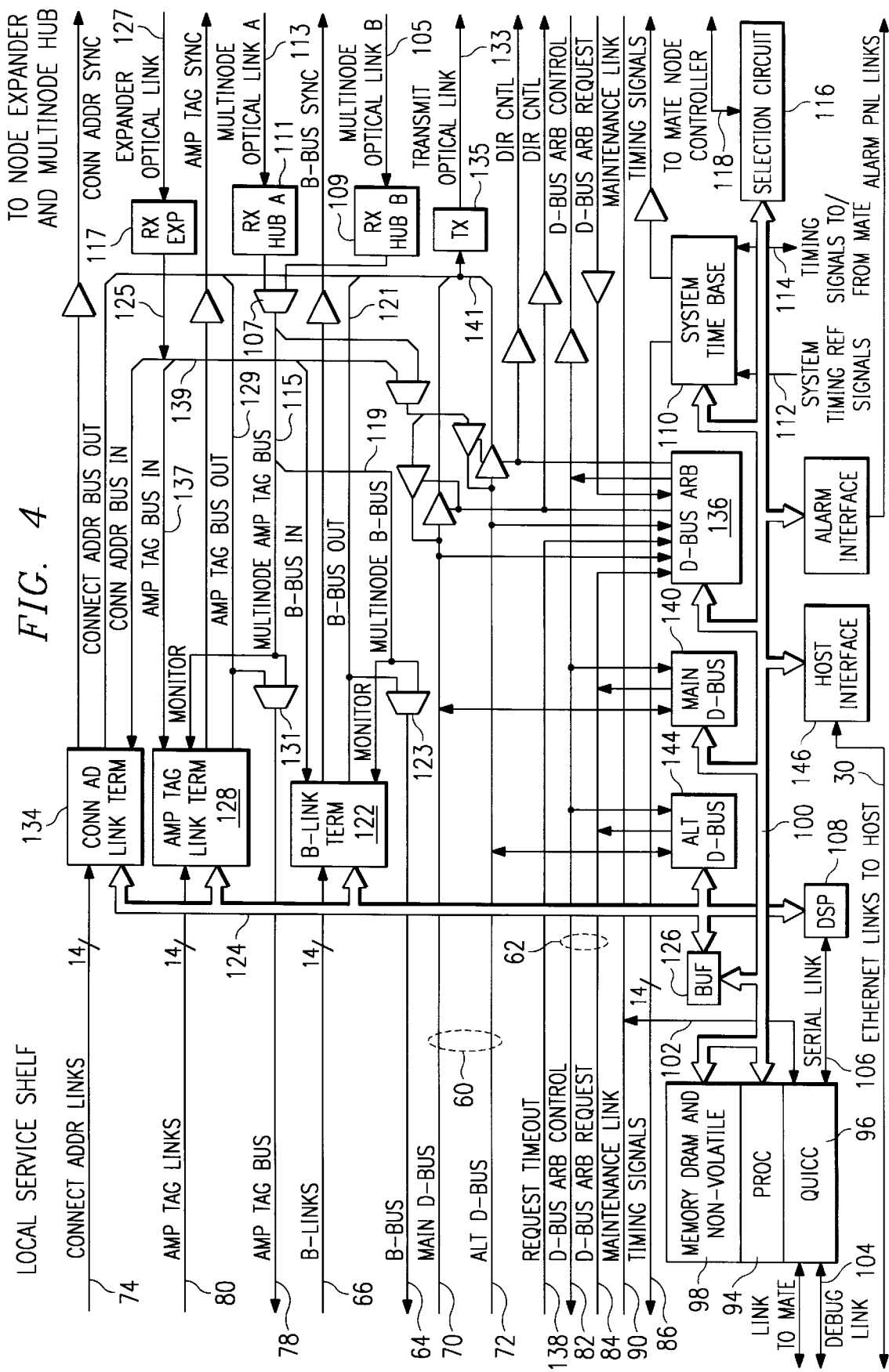
FIG. 4 illustrates a block diagram of the node controller.

Referring now to FIG. 4, there is illustrated a block diagram of the node controllers 32 and 34, only one of which is illustrated. The various buses that form a part of the communication bus 38 are illustrated on the left side of the block diagram. The D-Bus 60, as noted above, is comprised of a Main D-Bus 70 and an Alternate D-Bus 72. There are provided fourteen serial links 74 that are operable to receive address information each, referred to as a "Connect Addr Links" bus. There is provided an Amp Tag bus 78, which is an outbound bus and fourteen Amp Tag Inbound Links 80, these being serial links. The Amp Tag information is relating to a 4-bit amplitude tag which is generated for the purpose of conferencing that will be described in more detail hereinbelow. The information received on the Amp Tag Links 80 comprises the Amp Tag signals from the service controllers 20. These are converted into a parallel format for transmission on the outbound bus 78. There are provided arbitration buses, an outgoing D-Bus arbitration control bus 82 and an inbound D-Bus arbitration request bus 84. Timing signals are output on a timing bus 86, with maintenance information being received on a bi-directional bus 90.

The heart of the node controller 34 is the microprocessor complex. This is comprised of a central microprocessor 94 of the type Motorola 68040, with a companion QUICC 96 of the type Motorola 68360 and a non-volatile boot memory 98 and volatile DRAM associated therewith. The processor 94 and memory 98 interface with a system bus 100, whereas the QUICC 96 interfaces through a serial link 102 with the maintenance link bus 90. The QUICC 96 also interfaces through a debug link bus 104. The QUICC circuit 96 provides the I/O interface for the microprocessor 94, including the interface to the Main D-Bus. Serial communication link 106 is provided for an internal Digital Signal Processor (DSP) 108 from the QUICC 96.

A system time base circuit 110 is provided, which interfaces with the system bus 100, and also receives system timing reference signals on a line 112. When a system is utilized to terminate only analog network circuits, the time base will be generated by a free-running, precision oscillator. When digital circuits are terminated, the time base circuit 110 will be phase locked to network timing reference signals received on the line 112. Two reference signals will be accommodated with one designated as the primary timing reference and the second designated as a secondary timing reference. Selection of the active reference will be under the control of the processor 94. In the case of a failure of both network timing reference signals, the free-running, precision oscillator will provide the timing reference. The accuracy of the oscillator will be such that slip rates of terminated digital circuits will be within that allowed for a Stratum 3 clock running in holdover mode.

The time-base circuit of one of the redundant node controllers 32 or 34 will be selected as the master time base. The time base of the mate node controller will be phase locked to the master time base. The system time base 110 for one controller is connected to the timing signals from the mate through a line 114. The selection of the master time base will be coupled with the selection of the active node controller (i.e., one of the selected node controllers 32 or 34) for other functions such as a D-Bus arbitration function and alarm 40. Control signals will be connected between the two node controllers 32 and 34 that will assure that only one of the pair can be in the active mode. The timing sequence is generated by both copies of the node controller and will be distributed to all the service controllers within a switching node 14. The selection circuit for selecting between the two node controllers 32 and 34 for the active copy is provided by selection circuit 116 that is interfaced with the system bus 100 and interfaces with the mate node controller through a line 118.

Timing monitor circuits will be provided within the system time base circuit 110 to monitor the status of timing signals. The circuits will be capable of detecting gross frequency deviations and a failure to lock to a reference signal. Frequency deviations will be monitored for the network timing reference signals received on line 112, the timing sequence is generated by the local system time-base circuit and timing signals are received from the mate node controller 32 or 34.

In some applications, the primary and secondary timing reference signals may carry information regarding the status of the received reference signals. The system time-base circuit 110 will provide the capability to terminate such signals and will recover the status information. In order to accommodate the various network timing reference signals that may be required, a daughter circuit (not shown) will be provided for terminating the reference signals. The processor 94 will have maintenance access to the system time-base circuits, including the daughter card (not shown), for monitoring information recovered from terminated reference signals and the timing monitor circuits.

There are fourteen B-LINKs 66, one for each service controller 20, operable to provide a point-to-point serial transmission link for transporting the B-CHNLs from the associated service controllers 20 to the node controllers. This B-LINK 66 is input to a B-LINK terminator 122. The data is carried in a serial format and will operate at a clock rate of 16.384 MHz. The B-LINK terminator 122 converts data received on the B-LINK 66 to a parallel format for transmission to a B-Bus Out 121 and controlled by an intermediate bus 124. The bus 124 is connected to the system bus 100 through a buffer 126. The B-Bus Out 121 is connected through a MUX 123 to the B-Bus 64. B-Bus out 121 is also connected to optical transmitter 135 for transmitting B-Bus data to a node expander or to the hub in multinode systems. A multinode B-Bus 119 is connected to the other input of the MUX 123. A B-Bus In 125 is connected from a receiver 117 to the B-LINK terminator 122, the receiver 117 interfacing with an expander through an optical link 127. The DSP circuit 108 is operable to select which of the serial B-LINK buses 66 data is to be transmitted on and whether data is to be transmitted to/from the expander or the multinode system. The B-Bus Out 121 data can be selected from the B-LINKs 66 or from B-Bus In received from the receiver 117. In single node systems, B-Bus 64 will be selected from B-Bus Out 121. In multinode systems, B-Bus 64 will be selected from multinode B-Bus 119.

In general, the B-LINKs are received from the twelve primary service controllers 20 and two spare service controllers 20. This provides a total of fourteen service controllers and, therefore, fourteen serial buses 66. The B-LINKs (bearer links) are formatted such that they will be comprised of a frame of 125 microseconds, having 170 channels disposed therein from CH1 through CH170, with a dead-time channel. Each of the channels is comprised of nine bits of information, of which the ninth bit is a reserve bit. The tenth bit provides a trace bit and an eleventh bit provides a parity bit and a twelfth bit is unused. The first eight bits of each channel will normally carry a DS0 channel. The trace bit in bit 10 is utilized to verify that correct connections are maintained through the B-CHNL transport paths. Since only twelve active service controllers 20 will be supported in the disclosed embodiment, data from a maximum of twelve of the fourteen possible B-LINKs connected to a BLINK terminator 122 can be selected for transport on B-Bus 64 at a time.

The B-Bus 64 will provide 2048 channels, of which 2040 will be capable of carrying B-CHNLs. For the B-Bus 64 created by the B-LINK terminator 122, the 2040 channels will be divided into twelve transport groups of 170 channels. A transport group will carry the channels associated with a selected B-LINK. Channels of the twelve transport groups will be interspersed on the B-Bus 64. In order to support complete flexibility in defining service controller redundancy options, BLINK terminator 122 will provide a capability to map any B-LINK to any transport group on the associated B-Bus 64. The mapping of B-LINKs to transport groups on the node controller 32 or 34 will be controlled by the node controller processor 94.

The Amp Tag Links are transmitted on fourteen separate serial buses 80 to an Amp Tag Link terminator 128 that is operable to convert the Amp Tag Link of a particular serial bus to a parallel format for output on an Amp Tag Bus Out 129 for input to a MUX 131, the output thereof connected to the outbound Amp Tag bus 78, with bus 129 connected to a transmit optical fibre 133 trough a transmitter 135, the bus 121 also connected to this optical link 133. The other input of the MUX 131 is connected to a bus 115 for receiving Amp Tag information from the multinode circuit on either a link 113 or 105. A MUX 107 selects between these links 113 and 105, which are received on receivers 111 and 109, respectively.

There is provided an Amp tag input bus 137 for receiving Amp Tag information from the link 127. The Amp Tag bus 78 is 6-bits wide to provide a 4-bit data field for carrying the Amp Tag codes. In addition, there will be provided one trace bit and one parity bit covering the data bits. The trace bit will carry a trace code that will be used in a manner similar to that described for the B-Bus 64. The buses will operate at a clock rate of 16.384 MHz and will accommodate 16,384 channels utilizing a frame period of one millisecond. Of the 16,384 channels available, 16,320 channels will be used for the Amp Tag transport and the remaining 64 channels will not be accessible. The 16,320 channels will be organized into 96 transport groups (8 nodes×12 links per node) of 170 channels each. Each switching node will be assigned twelve transport groups to accommodate the twelve active Connect Address Links that will be supported. Amp Tag signals will be mapped to the Amp Tag bus 78 in a manner similar to that of the B-CHNLs. Mapping of active Amp Tag signals to Amp Tag transport groups will be coupled with the mapping of the associated B-CHNLs. This, of course, is carried out by the DPS 108, which interfaces with the Amp Tag Link terminator 128 through the intermediate bus 124. As such, the Amp Tag Link terminator 128 will provide a capability to connect selected channels to its DSP interface for use in fault isolation routines.

There are also provided fourteen Connect Address Links 74, each of which is a serial databus. This allows the twelve primary service controllers 20 and spare service controllers 20 to be terminated at a Connect Address Link terminator 134. The Connect Address Terminator 134 also receives address from the link 127 through bus 139 and outputs address to the link 133 through bus 141. These Connect Address Link buses 74 will provide a point-to-point serial transmission link utilized to transport Connect Address signals from service controllers 20 to node controllers 32 and 34. The connection arrangement between the node controllers 32 and 34 and the service controllers 20 will be the same as that defined for the B-LINK buses 66. The Connect Address Link buses will operate at a clock rate of 16.384 MHz. The links will be organized into 16 super-frames (2 milliseconds), with each frame carrying 85 channels. A period of eight clocks will exist at the end of each frame where no data will be transported. Eight Connect Addresses will be required to define the connection associated with a conference circuit, the conference circuit described hereinbelow. The eight addresses required for each of the 170 B-CHNLs supported by a service controller 20 will be transported on the associated Connect Address Link 74 to the Connect Address link terminator 134. The first of eight connect address for all 170 channels will be transported in the first two frames, the second connect address for all 170 channels will be transported in a third and fourth frames, and so on. Connect Address signals will provide 24 bits for transporting a Connect Address and Amp Tag signals. The Connect Address channel format will be such that the first 16 bits of Connect Address channels carry the value of the Connect Address. Bit 17 will carry a single channel that will indicate that a transparent connection is required at the conference circuit for this channel. Bit 18 will carry a trace flag utilized in maintenance routine and bit 19 will carry a parity bit that will cover the first 18 bits. Bits 20 and 24 will not be utilized.

The Amp Tag Links 80 will be comprised of 170 Amp Tag channels that will be transported in each of the B-CHNL frames, which is 125 microseconds in length. Since the Amp Tag frame is defined to be eight B-CHNL frames in length, the Amp Tag data will be repeated in the eight frames corresponding to the Amp Tag frame. In the single-node system of the present invention, data transported in the first B-CHNL frame will be utilized to sort the conference addresses. The first 4 bits of each channel will be the data bits, with the fifth bit being the trace bit and the sixth bit being the parity bit. Bits seven through twelve are unutilized. Data arriving at the Connect Address Link terminator 134 will be converted from the serial format to a parallel format for transport on the bus 141. Data from a maximum of twelve of the fourteen Connect Address Links 74 can be selected for transport on the bus 141. Since eight Connect Addresses must be transported for each B-CHNL supported in a switching node, the Connect Address Link terminator 124 must convert this into parallel addresses numbering 16,320. The parallel transmission of this must be structured to provide 16,384 channels with a 2 millisecond superframe.

D-Bus Arbitration

The D-Bus arbitration is controlled by a D-Bus arbitrator circuit 136, which is operable to receive the arbitration request from the line 84 and information from both the Main D-Bus 70 and the Alternate D-Bus 72. Also, a request timeout will be received from a Request Timeout line 138. In addition to providing arbitration for access to the Main and Alternate D-Buses, a number of maintenance functions will also be provided. A common arbitration circuit will be utilized to arbitrate the access to the Alternate D-Bus 72 and to high- and low-priority transport on the Main D-Bus 70. A and B copies of the Arbitration Bus (ARB Bus) will be connected to all card slots in a Service Subsystem, including the Expansion Service Shelf when it is equipped. The bus will transport a 5 bit card address field, a 5 bit function address field, a parity bit covering the 10 address bits and a Request line. The address fields will be generated by the arbitration state machines and the Request line 84 will be activated by devices requiring access to the D-Bus (70 or 72). The state machine will monitor the Request signal and busy signals associated with the Main and Alternate D-Bus. A busy signal provided with each physical D-Bus will be activated when a device is transmitting on the corresponding bus.

The card address field will be used to address a card or cards for a function indicated by the function address field. Switching nodes will accommodate a maximum of 30 devices (including a pair of node controllers) connected to the local D-Bus. Addresses 0 through 29 will be used to address individual cards and address 30 will be assigned as a Global Address (ALL) that will be used to select all devices connected to the D-Bus for a specified function.

Arbitration codes will be used to enable requests on a common Request Line connected to devices on the D-Bus. Arbitration codes defined for the function field include:

1) Main D-Bus High Priority Request Enable—High Priority Main D-Bus requests on addressed devices will be enabled to the Request Line while this code is present on the ARB Bus. The state is defined for the ALL address, for individual card high addresses, and for individual card low addresses.
2) Main D-Bus Low Priority Request Enable—Low Priority Main D-Bus requests on addressed devices will be enabled to the Request Line while this code is present on the ARB Bus. The state is defined for the ALL address, for individual card high addresses, and for individual card low addresses.
3) ALT D-Bus Request Enable—ALT D-Bus requests on addressed devices will be enabled to the Request Line while this code is present on the ARB Bus. The state is defined for the ALL address, for individual card high addresses, and for individual card low addresses.
4) Main D-Bus High Priority Grant—A High Priority Main D-Bus Grant will be issued to the addressed device when this code is transmitted. The state is only defined for individual card complete addresses.
5) Main D-Bus Low Priority Grant—A Low Priority Main D-Bus Grant will be issued to the addressed device when this code is transmitted. The state is only defined for individual card complete addresses.
6) ALT D-Bus Grant—An ALT D-Bus Grant will be issued to the addressed device when this code is transmitted. The state is only defined for individual card complete addresses.

The arbitration circuit 136 will detect requests for transmit access for all elements connected to the D-Bus, including its own D-Bus transmitter, and will grant access in a round-robin scheme. The Arbitration circuit will narrow the search for the requesting component by first using the high address field then using the low address field. While a granted message is being transported, the arbitration circuit 136 will arbitrate any other pending request for the next frame cycle. Only the arbitration circuit 136 on the active one of the node controllers 32 or 34 will be active for resolving D-Bus access requests. Signals connected between redundant node controllers 32 and 34 will assure that only one of the pair of controllers 32 and 34 is active at one time. No attempt will be made to synchronize the redundant arbitration circuits. When a previously inactive circuit becomes active, it will start its arbitration cycle address "0."

As noted above, various maintenance commands are accommodated by the arbitration circuit 136. These commands will be utilized to control logic associated with the arbitration bus in the interface devices connected to the D-Bus 70 or 72. Maintenance commands supported by the circuit 136 will include:

1. Reset—A reset command will cause a reset signal to be generated to a selected device connected to the D-Bus. The command is only defined for individual card addresses. Sufficient redundancy will be provided in a reset code to make the probability of an inadvertent reset due to errors in the control signal very low.
2. Globel Reset—The Global Reset Command will cause a reset signal to be generated to all devices connected to the D-Bus. The command is only defined for the ALL address. This command will not be included in the initial design.
3. Arbitration Circuit Select—The arbitration circuit select command will cause one of the redundant arbitration operation buses 62 or 62' to be selected. The operation bus on which the command is received will become the active bus for all devices. The command is only defined for the global address.
4. Disable D-Bus Drivers A—This command will cause the drivers associated with Request Line A, Main D-Bus A and ALT D-Bus A to be disabled. The command is defined for the Global Address and for individual card addresses.
5. Disable D-Bus Drivers B—This command will cause the drivers associated with Request Line B, Main D-Bus B and ALT D-Bus B to be disabled. The command is defined for the Global Address and for individual card addresses.
6. Enable D-Bus Drivers A—This command is associated with request lines, Main D-Bus and Alternate D-Buses for remote controller 32 to be enabled. Command defined for global address and for individual card addresses.
7. Enable D-Bus Drivers B—This command will cause the drivers associated with request lines, Main D-Bus and Alternate D-Buses associated with node controllers 34 to be enabled. The command is defined as a global address and for individual card addresses.

The D-Bus 70 is input to a Main D-Bus interface 140, which will also be interfaced with the arbitration request on the line 84 and the arbitration control signals on line 82. The interface 140 will provide for separation of the Main D-Bus into high- and low-priority messages. Normal call processing and maintenance messages will be sent as high-priority messages. Low-priority messages will be utilized for such functions as transport of packetized voice messages. Traffic on the Alternate D-Bus will be restricted to messages associated with delay-sensitive functions, such as low latency inquiry/response transactions.

In further detail, the main D-Bus interface 140 is connected to the system bus 100 to the processor 94. When a message is to be transmitted, the processor 94 will load the message into a buffer in its memory 98 and append a header at the beginning of the message. The header will contain the physical address of the destination device or logical device represented by a global conference identification (GCID) address. A number of devices may be set up to receive a logical address. When the processor 94 is ready to transmit a message or load it into its memory, a buffer descriptor associated with the message will be set up in the QUICC 96.

The QUICC 96 will interact with the Main D-Bus interface 140 to transfer the message to a FIFO in the Main D-Bus interface 140. Separate transmit FIFOs will be provided for low- and high-priority messages. The high- or low-priority FIFO will be identified in the QUICC 96 buffer descriptor, such that the message will be transported to the correct FIFO. An access request will then be posted at the appropriate priority level by the interface when a FIFO is loaded. The Main bus interface 140 will then interact with the arbitration circuit 136 to gain access to the bus. Once access to the bus 70 is granted, the interface will transfer the message from the FIFO to the Main D-Bus 70. Parity will be generated for each data byte as the message is being Read from the FIFO and the parity bit will be transported with the data. A Longitudinal Redundancy Check (LRC) will also be calculated by the interface 140 and the check code will be appended to the end of the message. The interface 140 will then transmit a Main D-Bus BUSY signal with the message data to delimit the transmission at D-Bus receivers on the node. The BUSY signal carried in the tenth bit of the parallel Main D-Bus will also be monitored by the arbitration circuits to determine when the bus has been released for a new transmission. As such, the D-Bus must be interfaced with the arbitration circuit 136. When the message has been transmitted, a transmit buffer empty flag will be set in the interface for access by the processor 94 and an interrupt will be issued to the processor 94.

Main D-Bus messages will appear at the receive side of the Main D-Bus interfaces 140 and the message will then be checked against the Address Enable Table located in the interface 140 to determine if the message is to be received by the node controller. If an address is found to be enabled for reception, the priority of the message will be registered and data received on the bus 70 will be loaded into a receive FIFO buffer. A single-receive FIFO will be provided for receiving both high- and low-priority messages. An indication that a message has been received and an indication of the message priority will be made available to the processor 94 at the end of the transmission. A buffer descriptor for the indicated priority will be set up in the QUICC 96 and the QUICC 96 will interact with the interface to transport the message to a buffer in the processor 94 band designated for messages of that priority.

The parity of the data will be checked for each data byte received over the Main D-Bus 70 and any errors detected will be registered for access by processor 94. The redundancy provided by the node controllers 32 and 34 will allow a switch-over to be achieved in the event that there is an error. There are two copies of the Main D-Bus. Data is transmitted on both D-Buses, such that when an error is detected on one D-Bus, the switch-over can be facilitated to the other D-Bus 32 or 34.

The data transmitted on the Alternate D-Bus 72 will be initiated and terminated at the DSP circuit 108. An Alternate D-Bus interface 144 is provided for interfacing with the Alternate D-Bus 72 and also with the Arbitration Control Line 82 and the Arbitration Request Line 84. Hardware maintenance functions are provided by the interface 144, which will also be accessed by the node controller DSP circuit 108. The node controllers will have the capability to initiate requests to an inquiry/response function located on other devices, and will have the capability to respond to inquiries initiated by other devices. When a node controller 32 or 34 is required to respond to low-latency inquiry/response transactions, such as GCID allocation, the transaction will be handled by the DSP 108. The DSP 108 will also provide the interface to the alternate D-Bus 72 for inquiry/response transactions initiated by the node controller processor 94.

When the processor 94 initiates an inquiry/response transaction, the transaction request will be transmitted to the DSP 108 on the serial communication link 106 connecting the DSP 108 to the QUICC 96. The DSP 108 will load the request into the interface 144 transmit buffer. The request will contain the physical or logical addresses of the device that supports the required transaction. The bus access request will then be registered at the interface at the time the buffer is loaded. The interface will interact with the arbitration circuits to gain access to the Alternate D-Bus 72 and will transmit the message when access is granted. A status flag associated with the transmit buffer will be available to DSP 108 to indicate when the buffer is empty.

When a response to the transaction request is received at the alternate D-Bus interface 144, the message will be loaded into the receive buffer associated therewith and an interrupt will be generated to the DSP 108. The DSP 108 will then Read the returned message from a receive buffer and pass the message to the processor 94 on the serial link 106. Requests for inquiry/response transactions received at the node controller Alternate D-Bus interface 144 will be loaded into the receive buffer associated therewith and an interrupt will be generated through the DSP 108. The DSP 108 will then Read the received message and process the transaction. The response of the transaction will be transmitted into the Alternate D-Bus interface transmit buffer and the Alternate D-Bus interface transmit buffer 144 will interact with the arbitration circuit 136 to transmit the message in the same way as described above for transactions initiated by the node controller.

When a message is transmitted from the transmit buffer associated with the interface circuit 144, a Cyclic Redundancy Check (CRC) code will be generated by the interface 144 and appended to the end of the message. The message will then be transmitted on both Alternate D-Buses 72 and 72' associated with node controllers 34 and 32, respectively.

Alternate D-Bus messages will appear at Alternate D-Bus receivers on both buses 72 and 72'. The message header will be checked against an Address Enable Table located in the interface 144 to determine if the message is to be received by that device. If the address is found to be enabled for reception, the data received on both copies of the bus will be loaded into receive buffers. The CRC code will be checked for both alternate D-Bus copies and, if the code is correct for the active copy, the active copy of the message will be gated to the DSP receive interface. If the CRC check fails for the active copy but passes for the inactive copy, and the automatic switch-over feature is enabled, then the message from the inactive copy will be gated to the DSP interface.

In order to interface with the Ethernet link 30, a host interface 146 is provided. The host interface will consist of two Ethernet ports utilized to connect to a host computer. Two 10BASE2 Ethernet interface circuits will be provided. A reset circuit will be provided with each interface 146 to permit the host to reset a particular node controller connected to each Ethernet link. The reset circuit will be implemented such that its operation will be independent of the state of the node controller processor 94 and adequate protection will be provided against inadvertent resets.

GCID Allocation

Logical addresses represented by the GCID (Global Conference ID) addresses will be assigned to a particular process when the processes are created. The GCID address will be placed in the Address Enable Table of all devices involved with the associated process. This mechanism will permit messages related to the process to be received by all of the associated devices. Therefore, a device joining an existing process will automatically receive related messages by enabling the GCID address in its Address Enable Table. At the time a call is initiated, a GCID address will be assigned to the call. Messages related to a particular call will utilize the assigned GCID in the message header such that all elements associated with the call will receive the message. When a service controller 20 sets up the call, it will send a GCID request message on the Alternate D-Bus 72. The message will contain the physical or logical address of the originating service controller 20 and the device providing the GCID allocation functions. The active one of the node controllers 32 and 34 that has been equipped to provide the GCID allocation function, will receive a message and allocate a GCID address from a pool of available addresses. The active one of the node controllers 32 and 34 will send the address to the originating service controller on the Alternate D-Bus 72. When the call is disconnected, the originating service controller 20 will send a release message containing the GCID address being released. The active one of the node controllers 32 and 34 will return the address to the pool of available addresses.

GCID allocation is provided utilizing the low-latency inquiry/response feature incorporated on the node controllers 32 and 34. The low-latency inquiry/response feature will be supported by the DSP 108 and available addresses will be stored in the DSP memory. GCID request and release messages will contain a unique GCID allocation message header, such that GCID messages can be detected at the Alternate D-Bus receiver on the receiving end at the service controller 20. Messages with GCID allocation headers will be received and made available to the DSP 108.

Both node controllers 32 and 34 will respond to GCID request and release messages while they are in service in order to keep the two copies of the GCID allocation memory equalized. Only the active node controller 32 or 34 will actually transmit a GCID address to the requesting device. Memory equalization will be required when an out-of-service node controller is placed in service and background audits will be required to assure that they remain equalized. Communication between the DSP circuits on redundant node controllers 32 and 34 for GCID allocation memory equalization will be accomplished via the main D-Bus 70.

To expedite the equalization process, access by the DSP to the processor DRAM memory 98 will be provided. Data transported from the DSP 108 on the active one of the node controllers 32 and 34 for GCID memory equalization will be written into the memory 98 and the DSP 108 will request the processor 94 to transport the data to the inactive node controller. The processor 94 on the inactive node controller 32 or 34 will receive a message containing the data and inform the DSP 108 of the location of the data. The DSP 108 on the inactive node controller will Read the data from the memory 98 and update its GCID memory.

The node controllers 32 and 34 have provided therefor interfaces with both a node expander (not shown) and a multinode hub (not shown). Each of these is operable to provide an expansion of the capability of a given node 14. Therefore, control lines are provided between the arbitration circuit 136 and the expansion devices, the arbitration control, the arbitration request and the maintenance link and also the timing signals. The information received from the expansion devices in the form of the Amp Tags on bus 115, the bus 119 and the Main D-bus 70 and Alternate D-Bus 72, respectively, are interfaced with the expansion devices. This therefore allows messages and information associated with the buses 38 to be transmitted between the buses 38 on the additional expansion devices. It is also noted that the optical links provide the interconnections to the other nodes in the system. In this manner, all of the service controllers 20 in all of the nodes 14 in the system effectively occupy a single bus with respect to the D-Bus.

Service Controller

Figure 5:
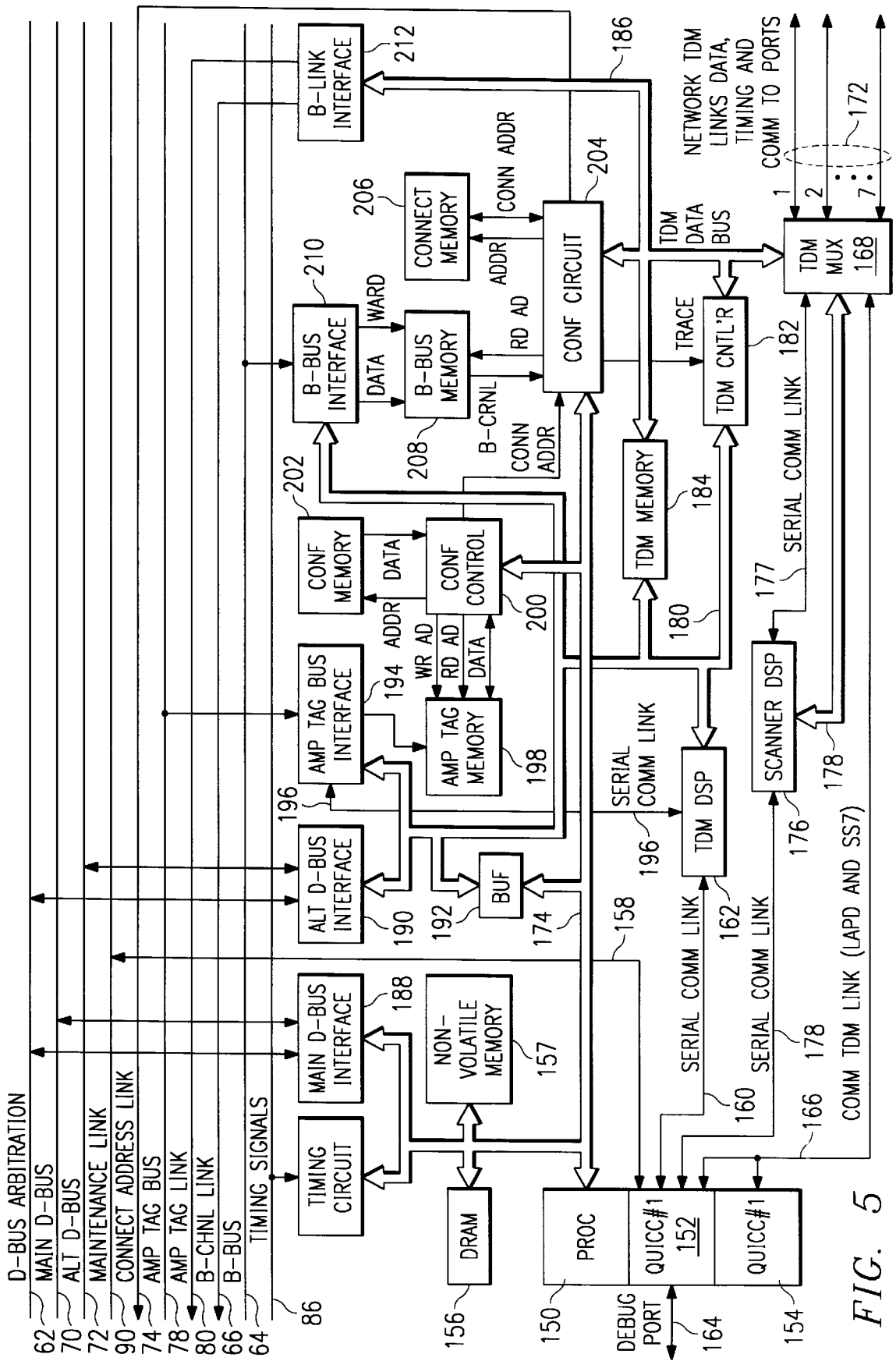
FIG. 5 illustrates a block diagram of the service controller.

The service controller 20, referring to FIG. 5, is operable to transport B-CHNLs, Amp Tag and Connect Address signals to and from other system elements. The service controller 20, also as noted above, will provide the conferencing aspect of the present invention and provide switching channels to the various network connections. Also, call processing software will reside in the service controllers 20 and the service controllers 20 will also be responsible for maintenance and fault recovery of network termination subsystems to which they are connected.

The service controller 20 includes a processor 150 of the type 68040 manufactured by Motorola, which is associated with two QUICC circuits, a QUICC circuit 152 and a QUICC circuit 154, both of the type 68360, manufactured by Motorola. A DRAM 156 and non-volatile boot memory 157 are provided. The nonvolatile memory 157 will contain codes for card initialization and for downloading application code and database into the DRAM 156. The DRAM 156 design will contain two physical banks and will support memory sizes ranging from 4 megabytes to 128 megabytes. The QUICC circuit 152 provides the I/O interface for the microprocessor 150, including the interface to the Main D-Bus 70. A serial communication link 158 is provided from the QUICC 152 to the maintenance link 90. Also, there is a serial communication link 160 between QUICC 152 and a DSP 162 associated with the timing the main multiplexing (TDM) function, a will be described hereinbelow. An external serial communication link 164 is provided to an external Debug port via an associated connector.

The QUICC 152 and the QUICC 154 are connected via a serial communication link 166 to a TDM multiplex circuit 168 for accessing B-CHNLs carrying LAPD or SS7 channels. This is facilitated via seven network TDM links 172, which carry data, timing and communication to the various network ports. Channels carrying LAPD connections will be terminated at QUICC 152. When the communication TDM link carries only LAPD channels (no SS7 channels), up to 32 channels can be accommodated. When SS7 signal terminations are supported by the service controller 20, the second QUICC 154 is utilized, which is equipped specifically for terminating the SS7 signals.

The processor 150 provides the higher levels of call processing and also will perform intermediate level maintenance functions. It will be subordinate to the node controllers 32 and 34 for maintenance functions. However, it will be superordinate to the equipment in the network termination subsystems for both call processing and maintenance functions. The processor 150 will also have directed access to the conference control circuit (described hereinbelow), for setting up and releasing conference circuits. The processor 150 is interfaced with a system bus 174 for interfacing with the remaining portion of the system, as will be described hereinbelow. The QUICC 152 also accesses a DSP 176 through a serial communication link 178 which is referred to as a "scanner DSP," which DSP 176 is operable to control access to call processing and maintenance functions in the network termination subsystems. The DSP 176 will control the TDM functions 168 through an intermediate bus 178, whereas the DSP 162 is operable to interface with an intermediate bus 180. The bus 180 is connected to a TDM controller 182 and also to a TDM memory 184. Maintenance and call processing functions associated with the TDM controller 182 will be accessed through the DSP 162. The TDM controller 182 and the TDM memory 184 are interfaced with the TDM multiplexer 168 through a TDM databus 186.

The Main D-Bus 70 and D-Bus arbitration are input to a Main D-Bus 20 interface circuit 188. It should be understood that duplicate copies of the Main D-Bus 70, Alternate D-Bus 72 and D-Bus arbitration signals on the arbitration bus 62 are available to the service controller 20. However, only one set of buses will be described for simplicity purposes. The alternate D-Bus 72 and the arbitration signals on the arbitration bus 62 are input with an Alternate D-Bus interface circuit 190. The arbitration circuits are interfaced with the service controller 20 via the arbitration bus 62 and, in addition to controlling D-Bus arbitration, also provide a number of maintenance functions. To control the arbitration and maintenance functions, a state machine in the arbitration circuit 136 of the node controller will generate a 5-bit card address field and a 6-bit function field. The state machine will monitor a Request signal, a Main D-Bus Busy signal and an Alternate D-Bus Busy signal generated by the service controllers 20. The address field will be utilized to address a card or cards for a function indicated by the function field. The various switching nodes 14 will accommodate a maximum of 30 devices connected to the local D-Bus. Addresses "0" through "29" will be utilized to address individual cards and address "30" will be assigned as a global address that will be utilized to select all devices connected to the D-Bus for a specified function.

Arbitration states will be utilized to register requests on a common request line connected to all of the service controller card slots and will be utilized to grant access to requesting devices. Arbitration states as defined in the function field include:

1. Request Enable—Pending requests for any D-Bus access (High-Priority Main, Low-Priority Main or Alternate) on addressed devices will be enabled to the Request Line 84 during this Arbitration Bus 62 state. The state is defined for the Global Address and for individual card addresses.
2. Main D-Bus High-Priority Request Enable—High-Priority Main D-Bus requests on addressed devices will be enabled to the Request Line 84 during this Arbitration Bus 62 state. The state is defined for the Global Address and for individual card addresses.
3. Main D-Bus Low-Priority Request Enable—Low-Priority Main D-Bus requests on addressed devices will be enabled to the Request Line 84 during this Arbitration Bus 62 state. The state is defined for the Global Address and for individual card addresses.
4. ALT D-Bus Requests Enable—ALT D-Bus requests on addressed devices will be enabled to the Request Line 84 during this Arbitration Bus 62 state. The state is defined for the Global Address and for individual card addresses.
5. Main D-Bus High-Priority Grant—A High-Priority Main D-Bus Grant will be issued to the addressed device during this Arbitration Bus 62 state. The state is only defined for individual card addresses.
6. Main D-Bus Low-Priority Grant—A Low-Priority Main D-Bus Grant will be issued to the addressed device during this Arbitration Bus state. The state is only defined for individual card addresses.
7. ALT D-Bus Grant—An ALT D-Bus Grant will be issued to the addressed device during this Arbitration Bus state. The state is only defined for individual card addresses.

The arbitration circuit 136 will detect requests for transmit access from the service controllers 20 and will grant access in a round-robin scheme. While a granted message is being transported, the arbitration circuit 136 will arbitrate any other pending request for the next grant cycle. Maintenance commands will be utilized to control logic in the service controller 20 D-Bus interfaces. Maintenance commands supported by the circuit will include:

1. Reset—The Reset Command will cause a reset signal to be generated to a selected device connected to the D-Bus. The command is only defined for individual card addresses. Sufficient redundancy will be provided in the reset code to make the probability of an inadvertent reset due to errors in the control signal very low.
2. Globel Reset—The Global Reset Command will cause a reset signal to be generated to all devices connected to the D-Bus. The command is only defined for the ALL address. This command will not be included in the initial design.
3. Arbitration Circuit Select—The Arbitration Circuit 136 Select will cause one of the redundant Arbitration Buses (A or B) to be selected as the active copy. The Arbitration Bus 62 on which the command is received will become the active copy for all devices. The command is only defined for the Global Address.
4. Disable D-Bus Drivers A—This command will cause the drivers associated with Request Line A, Main D-Bus A and ALT D-Bus A to be disabled. The command is defined for the Global Address and for individual card addresses.
5. Disable D-Bus Drivers B—This command will cause the drivers associated with Request Line B, Main D-Bus B and ALT D-Bus B to be disabled. The command is defined for the Global Address and for individual card addresses.
6. Enable D-Bus Drivers A—This command will cause the drivers associated with Request Line A, Main D-Bus A and ALT D-Bus A to be enabled. The command is defined for the Global Address and for individual card addresses.

7. Enable D-Bus Drivers B—This command will cause the drivers associated with Request Line B, Main D-Bus B and ALT D-Bus B to be enabled. The command is defined for the Global Address and for individual card addresses.

A maintenance command will be executed for an addressed service controller when the corresponding code is received in the appropriate function field. Sufficient redundancy will be provided in the codes to make the probability that a command will be executed inadvertently due to random errors in the function field are very low.

Traffic on the Main D-Bus 70 will be separated into high- and low-priority messages. Normal call-processing and maintenance messages will be sent as high-priority messages. Low-priority messages will be associated with such functions as the transport of packetized voice messages that may be sent from one service controller to another. Traffic on the Alternate D-Bus 72 will be restricted to messages associated with delay-sensitive functions, such as low-latency inquiry/response transactions and PTT (push-to-talk) messages.

The Main D-Bus interface 188 is connected to the system bus 174 and the Alternate D-Bus interface 190 is connected to the intermediate TDM DSP Bus 180, both buses 174 and 180 being interfaced together through a buffer 192 to provide the DSP access to the processor DRAM 156. When the Main D-Bus is required to be connected to the processor 150, the QUICC 152 facilitates this through bus 174, as they share bus 174.

The Amp Tag bus 78 is interfaced with the intermediate system bus 180 through an Amp Tag bus interface circuit 194. A serial communication link 196 connects the Amp Tag bus interface 194 with the DSP 162 to provide for fault monitoring. Additionally, the Amp Tag bus interface 194 interfaces with an Amp Tag memory 198. The Amp Tag memory 198 is operable to be utilized in the conference mode, which will be described in more detail hereinbelow, which includes a conference-control circuit 200 and a conference memory 202. The conference-control circuit 200 interfaces with the memory 202 and also with the Amp Tag memory 198. The conference control 200 also interfaces through an address line with a conference circuit 204. The conference circuit 204 is operable to interface with its own connect memory 206 and also with a B-Bus memory 208 to transmit Read addresses thereto and receive B-CHNL information therefrom. The B-Bus memory 208 receives data from a B-Bus interface 210, which interfaces with the B-Bus 64. The B-Bus interface 210 also interfaces with the intermediate system bus 180, receiving control signals from the DSP 162. The Amp Tag Link and the B-CHNL Link buses 80 and 66, respectively, are interfaced with a B-Link interface 212, which is operably interfaced with the TDM databus 186.

Figure 6:
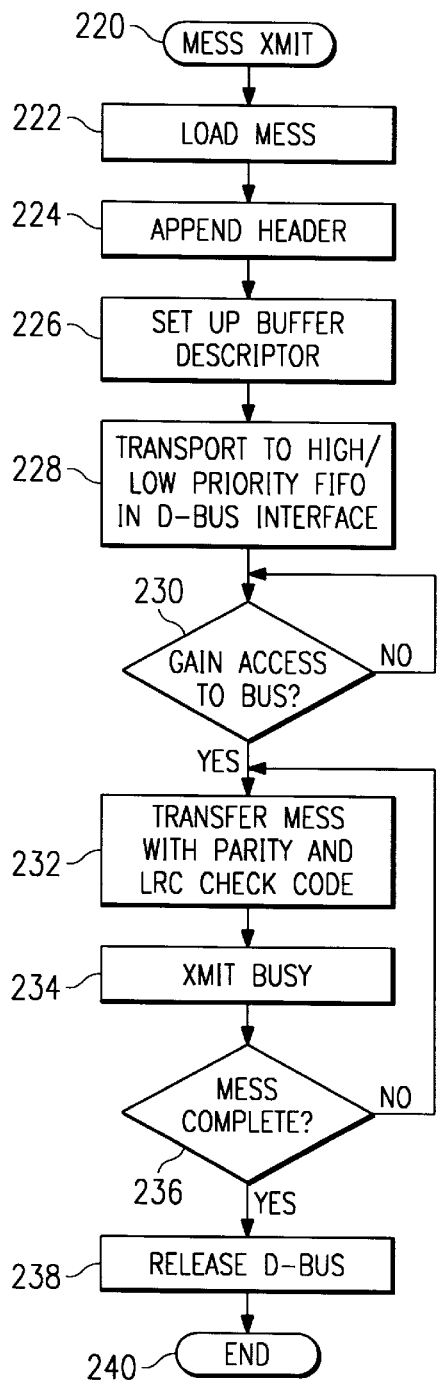
FIG. 6 illustrates a flowchart for transmission of messages through to the D-Bus.

Referring now to FIG. 6, there is illustrated a flowchart for the message transmission operation when a message is transmitted to the D-Bus 70. The operation is initiated at a block 220 and then the flowchart proceeds to a block 222, wherein a message is loaded into the CPU 150 buffer. This is the volatile DRAM 156. The flowchart then flows to a block 224, wherein a header is appended to the beginning of the message. The header will contain the physical address of a destination device or a logical address represented by the Global Conference Identification (GCID) address. A number of devices may be set up to receive a logical address. After the message is loaded into memory, the processor 150 will set up a buffer descriptor associated with the message in the QUICC 164, as represented by block 226.

After the message has been set up, the QUICC 164 will interact with the Main D-Bus interface 188 to transfer the message to a FIFO located in the interface. This is indicated in function block 228. Separate transmit FIFOs will be provided for low- and high-priority messages in the D-Bus interface 188. The high- or low-priority FIFO will be identified in the QUICC buffer descriptor such that the message will be transported to the correct FIFO. The program will then flow to a decision block 230.

In the decision block 230, the Main D-Bus 188 will interface with the arbitration bus 62 to send a bus request to the node controllers 32 and 34. This access request will be posted at the appropriate priority level in the Main D-Bus interface 188 at the time the transfer of the FIFO begins from the memory 156. The program will flow along the "N" path to the input of decision block 230. When access is granted, the program flows along the "Y" path to a function block 232. At this point, the message is transmitted from the FIFO to both copies of the Main D-Bus 70 and 70', only Main D-Bus 70 illustrated in FIG. 5. Parity will be generated for each data byte as the message is being read from the FIFO and the parity bit will be incorporated with the data. A Longitudinal Redundancy Check (LRC) will also be calculated by the interface and the check code will be appended to the end of the message. The interface will transmit a Main D-Bus Busy signal with the message signal to delimit the transmission at D-Bus receivers in the rest of the system, as indicated by a function block 234. The program will flow to a decision block 236 to determine if the message transmission is complete. If not, the program will flow back to the input of the function block 232 along the "N" path. The Busy signal is carried in a tenth bit of parallel Main D-Bus 70, which is monitored by the arbitration circuit 136 to determine when the bus has been released for a new transmission, as indicated by a function block 238. The program will then flow to an END block 240. At this point, a transmit buffer Empty flag will be set in the interface 188 for access by the processor 150, and an interrupt will be issued to the processor 150.

Figure 7:
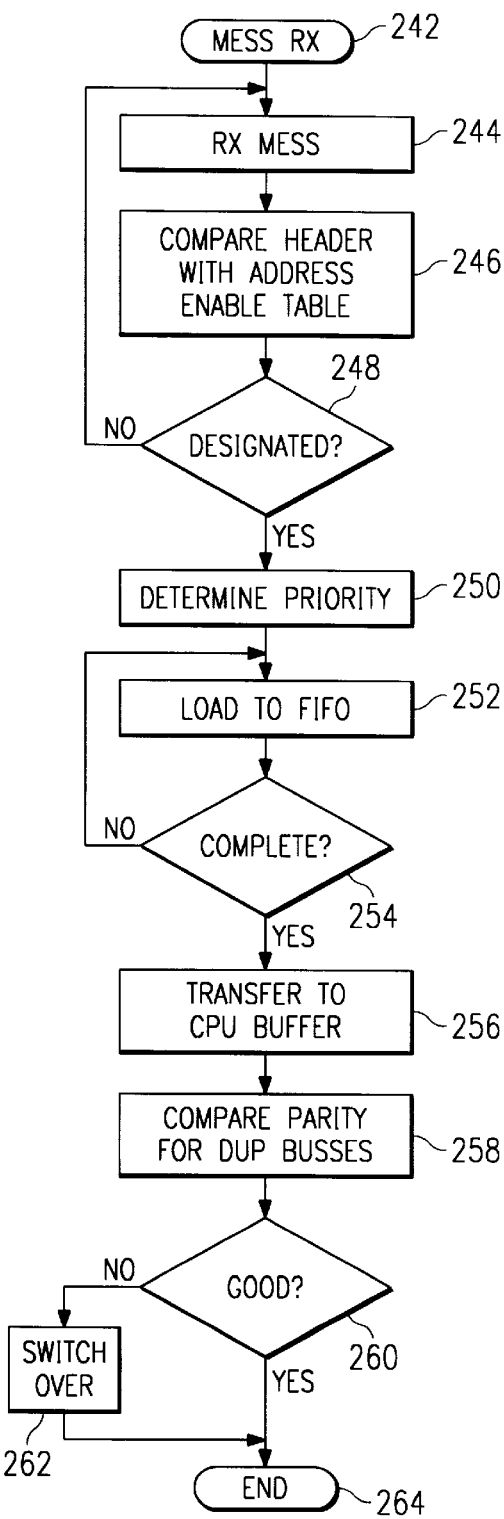
FIG. 7 illustrates a flowchart for receiving messages from the D-Bus.

Referring now to FIG. 7, there is illustrated a flowchart depicting the operation wherein a message is received from the Main D-Bus 70, which is initiated at a block 242. The program then flows to a function block 244 to receive messages from the D-Bus when they are transmitted thereon. In this mode, all messages will be examined by the D-Bus interface 188. The program will then flow to a function block 246 to examine the header and compare it with the internal Address Enable Table stored in the interface 188. The program will then flow to a decision block 248 to determine if the message that is on the D-Bus 72 is to be received by that particular service controller 20. If not, the program will flow along the "N" path back to the input of the function block 244. If the message is designated for that service controller 20, then the program will flow along the "Y" path to a function block 250 to determine the priority of the message. The data received on the active copy of the two redundant Main D-Buses 70 and 70' will then be loaded into a receive FIFO buffer on the interface 188. A single-receive FIFO is provided for both high- and low-priority messages. This operation is indicated by a function block 252. The received information will continue to be loaded into the FIFO 252 until the operation is complete, as indicated by a decision block 254. Once received, an indication that a message has been received and an indication of the message priority will be made available to the processor 150 at the end of the transmission. A buffer descriptor for the indicated priority will be set up in the QUICC 152 and then the QUICC 152 will interact with the interface 188 to transport the message to a buffer in the DRAM 156 designated for messages of that priority, as indicated by a function block 256.

Since data is transmitted over both copies of the Main D-bus, data will be received for both buses and the parity for each of these messages compared with the message itself to determine the level of error that exists in the message as each byte is received. This operation is indicated by function block 258. These errors will be registered for access by the processor 150. The program will then flow to a decision block 260 to determine if the active copy of the message is error-free. If not, the program will perform a switch-over to the Redundant Main D-bus 72' to make that the "active" bus. This is described hereinabove with respect to the selection circuit 116 in FIG. 4. This is a software-enabled function and may be disabled at any time, such that the switch-over is not automatic. Of course, whenever a switch-over is made, the automatic switch-over function is disabled until it is re-enabled by software. In addition to the parity error, the LRC code will also be checked at the interface and an indication of an error will be made available to the processor. After the parity has been checked and the switch-over made in the event of an error, the program flows to an END block 264.

Data transport on the Alternate D-Bus 72 will be initiated and terminated at the DSP 162. Functions associated with the Alternate D-Bus 72 that have been defined for the TDM 108 include inquiry/response transactions and push-to-talk (PTT) transport. However, maintenance functions associated with the Alternate D-Bus 190 that will also be supported by the DSP 162.

Figure 8:
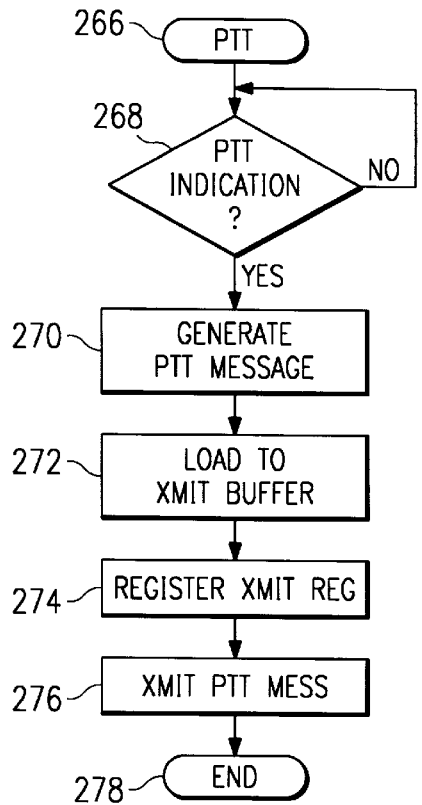
FIG. 8 illustrates a flowchart for transmission of a PTT (push-to-talk) message.

Referring now to FIG. 8, there is illustrated a flowchart depicting the handling of a push-to-talk indication generated at the service controller 20 and received from a network termination. The program flows to a decision block 268 to determine if a PTT indication for a console connected to a service controller 20 is registered in the TDM memory 184. The program will flow along an "N" path until a PTT indication is received. At this time, the program will flow along a "Y" path to a function block 270, wherein the DSP 162 detects the indication and then generates a PTT message. The logical address will be determined by the DSP 162 based on the address of the initiating device. This message will then be loaded into the transmit buffer of the Alternate D-Bus interface 190, as indicated by the function block 272. The program will then flow to a function block 274 in order to send a transmit request to the node controllers 32 and 34 via the arbitration bus 62. When access is granted, the program will flow to a function block 276 to transmit the PTT message on the Alternate D-Bus 72. The program will then flow to an End block 278.

Figure 9:
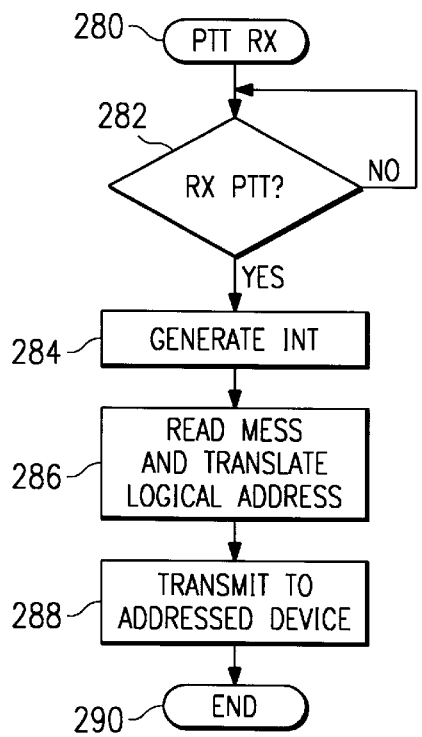
FIG. 9 illustrates a flowchart for receiving a PTT message.

Referring now to FIG. 9, there is illustrated a flowchart depicting the PTT-receive operation, which is initiated at a block 280. The program will flow to a decision block 282 in order to determine if a PTT message exists on the Alternate D-Bus 72. If a message is received, the program will flow along a "Y" path to the function block 284 and, if no message exists, the program will flow along an "N" path back to the input of decision block 282. When the program flows to function block 284, an interrupt will be generated to the DSP 162. The DSP 162 will then Read the message and translate the logical address carried therein to physical addresses, as indicated by function block 286. The DSP 162 will then cause a PTT indication to be transmitted to the addressed devices over the ports 172 through the TDM controller 182, as indicated by function block 288. The program will then flow to an End block 290.

Figure 10:
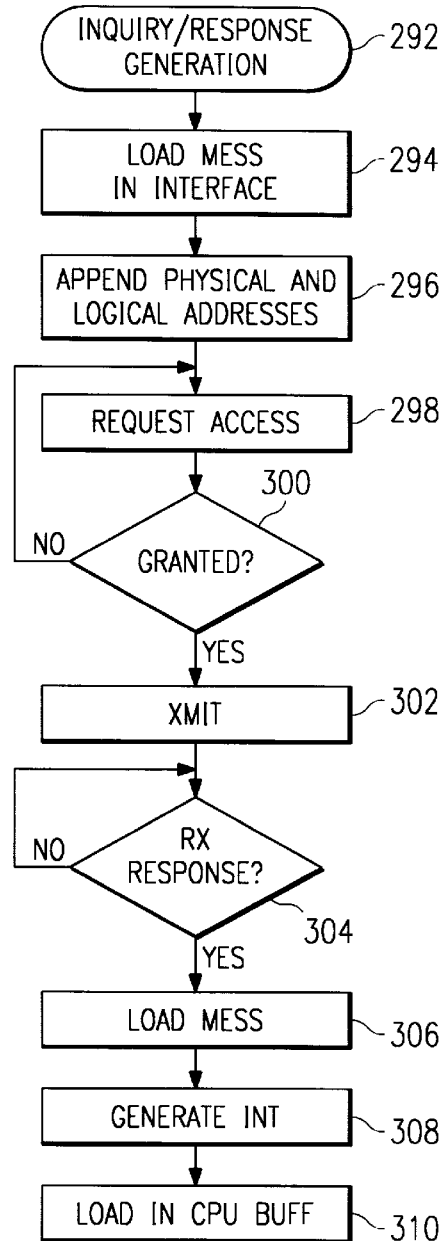
FIG. 10 illustrates a flowchart for the generation of an inquiry/response message.

Referring now to FIG. 10, there is illustrated a flowchart depicting the operation wherein an inquiry/response transaction is generated by the service controller 20, which is initiated at a block 292. The program will then flow to a function block 294 to load a message in the Alternate D-Bus interface 190. This operation first requires an indication by the processor 150 that an inquiry/response transaction is to be executed. A transaction request will be transmitted from the processor 150 to the DSP 162 on the serial COMM link 160 from the QUICC 152. The DSP 162 will then load the message into the Alternate D-Bus interface 190. The request will contain the physical or logical address of the device that supports the required transaction, as indicated by the function block 296. A bus access request will then be registered at the Alternate D-Bus interface 190 at the time the buffer is loaded, as indicated by a function block 298. The program will then flow to a decision block 300 to determine if access has been granted. The program will flow along the "N" path back to the input of the function block 298 until access is granted. At that time, the program will flow along the "Y" path to a function block 302 in order to transmit the request on the Alternate D-Bus 72. The program will then flow to a decision block 304 to wait for a response and will continue in a loop back to the input thereof until the response is received. When the response is received, the program flows to a function block 306 to load the received messages into a receive buffer in the Alternate D-Bus interface 190 and then generate an interrupt to the DSP 162, as indicated by a function block 308. The program then flows to a function block 310 to load the response into the memory 156 along the serial link 178. The program will then flow to an End block 312.

Figure 11:
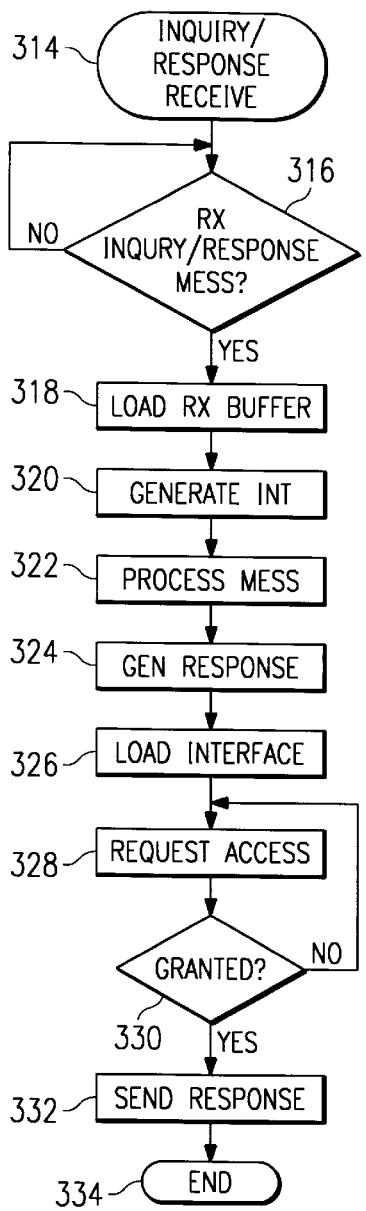
FIG. 11 illustrates the receive operation for an inquiry/response message.

Referring now to FIG. 11, there is illustrated a flowchart depicting the operation wherein an inquiry has been sent to the service controller 20, which is initiated at a block 314. The program then flows to a decision block 316 to wait for an inquiry message. The program will loop back around to the input of decision block 316 until the inquiry has been received. When the inquiry has been received, it is loaded into the receive buffer on the Alternate D-Bus interface 190 from the Alternate D-Bus 72, as indicated by function block 318. An interrupt will then be generated for the DSP 162, as indicated by a function block 320. The DSP 162 will then process the received message and the associated transaction. This is indicated by function block 322. The program will then flow to a function block 324 wherein a response will be generated by the DSP 162. This response will be unloaded into the buffer in the Alternate D-Bus interface 190, as indicated by function block 326 and then a request is generated by the Alternate D-Bus interface 190, as indicated by a function block 328. The program will then flow to a decision block 330 to await the grant of the request and then to a function block 332 to send the response. The program will then flow to an End block 334.

When a transmit buffer is loaded in the Alternate D-Bus interface 190, the bus access request is generated in the interface 190 and the interface will interact with the arbitration bus 62 for access to the Alternate D-Bus 72. Once a grant or request is received, the message will be transferred from the transmit buffer of the interface 190 to the Alternate D-Bus 72. A CRC code will be generated by the interface 190 and appended to the end of the message and the message will then be transmitted on both copies of the Alternate D-Bus 72 and 72'. A status flag associated with the transmit buffer will be available to the DSP 162 to indicate when the buffer is empty.

Alternate D-Bus messages will appear at the receivers on the input to the Alternate D-Bus interface 190 on both copies of the Alternate D-Bus 72 and 72'. The message header in the Alternate D-Bus messages will be checked against an Address Enable Table located in the interface 190 to determine if a message is to be received by the device. If the address is found to be enabled for reception, the data received on both copies of the Alternate D-Bus 72 and 72' will be loaded into receive buffers. The CRC code will then be checked for both Alternate D-Bus copies. If the code is correct for the active copy, the active copy of the message will be gated to the receive interface of the DSP 162. If the CRC check fails for the active copy, and an automatic switch-over has been enabled, the message from the inactive copy will be gated to the DSP 162. Once a switch-over occurs, the automatic switch-over capability will be disabled. The capability can be enabled or disabled by the DSP 162 at any time. A CRC error detected on either Alternate D-Bus copy will be registered and made available to the DSP 162. A status flag utilized to indicate that a switch-over has occurred will also be available to the DSP 162.

B-Link Interface

Data received from the network termination subsystems on the inbound portion of the links 172 will be carried in 19-bit TDM channels. The channels will each contain an 11-bit B-CHNL field, a 6-bit Amp Tag field and a 2-bit application specific field. The received TDM channels will be written into the TDM memory 184. The TDM memory 184 will be 16 bits wide and will be organized in a partition manner. The input B-CHNL information is set in a first partition of 256 words, the Amp Tag Field and the application specific field information is stored in the second partition of 256 words, the B-CHNL output information is stored in a third partition of 256 words, the TDM DSP B-CHNL information is stored in a fourth partition of 256 words, the TDM DSP Amp Tag information is contained in a fifth partition of 256 words and the control information is contained in a sixth partition of 512 words. The B-CHNL field consisting of nine data bits, a trace bit and a parity bit covering the nine data bits, will be written into the B-CHNL buffer in the first partition. Amp Tag fields consisting of four data bits, a trace bit and a parity bit and application specific fields will be written into the second partition. The TDM DSP information will also be capable of writing B-CHNL and Amp Tag data into the TDM memory 184. B-CHNL and Amp Tag data written by the DSP 162 will be written into the TDM DSP B-CHNL buffers in the fourth partition and TDM DSP Amp Tag buffers in the fifth partition. Data written by the TDM DSP 162 will conform to the TDM channel format. B-CHNLs written by the DSP 162 will include voice messages, tone and test patterns.

B-CHNL and Amp Tag data will be transported from the service controllers 20, the node controllers 32 and 34 by the B-Link interface 212 on the serial B-CHNL link 66 and Amp Tag link 80, respectively. The TDM controller 182 will Read selected B-CHNL and Amp Tag data from the TDM memory 184 and Write them to registers in the B-Link interface 212. Memory addresses stored in the buffer associated with the controller 182 will be utilized to select the B-CHNLs and associated Amp Tag channels to be read from the TDM memory 184 for each of the 170 B-CHNLs supported by the B-Link interface. When a control word is read from a control buffer for transport in a particular B-Link CHNL, the address will be utilized to access the corresponding Amp Tag channel, as well as the B-CHNL. Connection maps in the control buffer will be maintained by the DSP 162 under the direction of the processor 150.

The TDM controller will transfer B-CHNL and Amp Tag data to registers in the B-Link interface 212 at their assigned channel times on links. The data will be converted to a serial bit stream for transport on the inbound links.

Parity and trace codes carried in the inbound B-CHNLs and Amp Tag CHNLs will be transported through the service controllers transparently. A fixed code with correct parity and a valid trace code will be transmitted in idle B-CHNLs and Amp Tag channels. The idle channel codes will be written into the TDM memory 184 by the DSP 162 and the codes will be transported to the B-Link interface 212 by the TDM controller at the appropriate channel times.

B-Bus Interface

The B-Bus interface 210 is operable to receive both copies of the B-Bus 64 and 64' and will transmit data from the selected copy to the B-Bus memory 208. The B-Bus 64 will transport 2048 channels with 2040 of the channels capable of carrying B-CHNLs. Parity will be continuously checked for each channel received on both B-Bus copies. When an error is detected on a channel, an indication of the error will be registered with the address of the failed channel for access by the DSP 162. A register will be provided for each of the redundant buses 64 and 64'. A channel-specific parity test circuit will also be provided that will permit parity to be tested on a particular B-CHNL selected by the processor 150 via the DSP 162. In the absence of failures, the data from the active bus will be transmitted to the B-Bus memory 208. When an error is detected on the active bus, the B-Bus interface 210 will be capable of selecting data from the currently inactive bus if no errors are registered for the inactive channel and the capability has been ended by the processor 150.

When uncontaminated data is not available for a channel, an indication of the errored data will be written into the corresponding location in the B-Bus memory 208. This mechanism will permit errored data to be excluded from the summing circuit in the conference circuit, as will be described in more detail hereinbelow.

Trace codes carried with the B-CHNLs will also be routinely monitored at the B-Bus interface 210. Trace codes for B-CHNLs, as defined by the TDM DSP 162, will be accumulated in the B-CHNL interface 210 for access by the DSP 162. The value of received codes will be compared with expected values by the DSP 162. Expected values will be stored in buffers located in the DRAM 156. The buffer in the DRAM 156 containing the expected trace codes will be maintained by the processor 150. When trace code errors are detected, the condition will be reported to the processor 150 by the DSP 162.

Amp Tag Bus Interface

The Amp Tab bus interface 194 is operable to receive both copies of the Amp Tag bus 78 and 78'. The Amp Tag bus 78 will contain 16,384 channels, with 16,320 of the channels capable of carrying Amp Tag codes. Parity will be continuously checked for each channel received on both Amp Tag bus copies. When an error is detected on a channel, an indication of the error will be registered with the address of the failed channel for access by the TDM DSP 162. A register will be provided for each of the redundant buses. A channel-specific parity test circuit will be provided that will permit parity to be tested on a particular Amp Tag signal selected by the processor 150. In the absence of failures, the data from the active bus will be transmitted to the Amp Tag memory 198. When an error is detected on the active bus 78, the Amp Tag bus interface 194 will be capable of selecting data from the currently inactive bus when no errors are registered for the inactive bus and the capability has been enabled by the processor 150. When uncontaminated data is not available for a channel, a "0" code will be written into the corresponding location in the Amp Tag memory 198. The "0" code will cause errored data to be excluded from the Sort function in the conferencing-control circuit, as will be described hereinbelow.

Amp Tag trace codes will also be routinely monitored at the Amp Tag bus interface 194. Trace codes for Amp Tag channels designated by the DSP 162 will not be accumulated in the interface 194, but will be transported to the DSP 162 for accumulation and testing. The DSP 162 will select sixteen channels at a time for trace monitoring. The trace bits will be extracted from selected Amp Tag channels and transported to the DSP 162 over a 24-frame Amp Tag superframe period (192 B-CHNL frame). For example, the first bit of the trace code will be extracted and transported for all sixteen channels and the first Amp Tag frame of the superframe, the second bit for all channels will be extracted and transported in the second frame, and so on through the 24th frame, wherein the sync bit will be extracted. The sixteen bits extracted in each Amp Tag frame will be transported to the DSP 162 on the serial link 196. After the DSP 162 has collected all 24 bits of the sixteen trace codes, the value of received codes will be compared with expected values stored in buffers located in the DRAM 156. The buffers in the DRAM 156 contain the expected B-CHNL and Amp Tag channel trace codes will be maintained by the processor 150. To initiate a trace sequence, DSP 162 will Write the address of the first channel in a group of sixteen sequential channels to be tested into a register in the Amp Tag interface 194. Starting at the beginning of the Amp Tag superframe following the Write operation, circuits in the Amp Tag interface 194 will extract and transport the trace bits from the addressed channel and the fifteen following channels.

Conference Circuit

Conference circuits located in the service controllers 20 are operable to provide the switching and conferencing capability for a single node. In general, the conference circuit provides access to 2040 B-CHNLs, and will accommodate a conference of 480 conferees or each of the 170 outbound channels supported by a service controller 20. The conferees associated with each of the 168 outbound network channels will be defined in conference buffers in the conference memory 202. Two additional conference buffers will be provided to support maintenance functions for a total of 170 buffers. Conference circuits will be set up and removed by the processor 150. The processor 150 will access the conference buffers through the conference control circuit 200.

The conference memory 202 will be organized into 170 conference buffers, with each buffer accommodating 480, 17-bit words. A buffer will contain the addresses of B-CHNLs to be conferenced to the associated outbound channel. The 17-bit words of the buffers will contain the 16-bit B-CHNL address and a single-channel flag utilized to identify single-channel connections. In single-channel connections, only one inbound channel will be connected to the outbound channel. When a single-channel connection is initiated, the address of the channel to be connected will be written into the first location of a conference buffer associated with the outbound channel and the single channel flag will be set in that location. When a channel address with a single channel flag set is encountered at a conference circuit, the address channel will be passed through transparently. The reason for this is that it is desirable to pass data directly through the conference circuit 204 without performing a PMC/Linear, Linear/PCM translation, i.e., transparently. Also, a single channel will allow its parity and path ID to remain intact.

The 16-bit address field will provide a capability to address 65,536 channels, such that 32, 2K switching nodes can be supported. Since the maximum number of channels accommodated by the switching node 14 will be 2040, eight addresses per node will not represent valid B-CHNL addresses. Two of these invalid codes will be utilized to identify control codes. One of the control codes will be utilized to identify null locations in the conference buffers. A second control code has been defined as an End of Buffer code to be utilized by the conference controller 200 to terminate a buffer scan cycle.

When the processor 150 sets up the conference circuit, the addresses of the conferees will be loaded in sequential buffer locations, starting at the first location of the conference buffer. The End of Buffer code will be written in the location following the last address entry. When a conferee is removed from the list, a null code will be written into the corresponding location.

The conference-control circuit 200 will scan each of the 170 conference buffers sequentially, starting at the first location in each buffer. As the buffer is scanned, the Amp Tag associated with each address will be utilized to sort the addresses, such that the eight channels with the highest amplitude will be selected. At the End of Buffer scan cycle, the addresses of the selected channels will reside in eight Sort registers located in the conference control 200.

When the conference controller 200 finds a single channel flag set in the first location of a conference buffer, the contents of that location, including the flag, will be loaded into the first Sort register. The scan of that conference buffer will be terminated and the remaining seven Sort registers will contain the Null code. When the single-channel flag is not set in the first location of a conference buffer, the conference controller 200 will scan and sort the location sequentially until the End of Buffer code is encountered. Channels containing the null code will be skipped in the sorting process. The conference control circuit will terminate the sorting process for the current conference buffer when the End of Buffer code is encountered. For conferences with fewer than eight conferees, the addresses of the conferees will be loaded into the top Sort registers and the remaining locations will contain the null code.

At the end of the buffer scan cycle, scanning will be suspended until the contents of the sort registers are transported to the connect memory 206. Conference control circuit will interact with the conference circuit to transfer the contents of the sort registers to connect buffers located in the connect memory 206. Once the contents of the sort registers have been transported, the conference control circuit will continue the scan operation with the next conference buffer to be scanned.

The connect memory 206 will be 18-bits wide and will be organized into 170 connect buffers and 170 trace buffers that will shadow the connect buffers. A connect buffer will contain eight locations for storing connect addresses received from the conference control circuit 200 and one location for storing a mode select word. Eighteen bits have been defined for the eight connect address locations, including sixteen address bits, a single-channel flag and a trace flag. The trace buffers and trace flag will be used for fault coverage of connect address transport in multinode systems. The trace flag will always be cleared in the connect buffers.

The first location of each connect buffer will contain the mode select word. The contents of the mode select word will be under the control of the processor 150. The MSB of the mode select word will contain a mode flag used to differentiate between single-node and multinode operation of the conference circuit. When a conference circuit is required in a single-node system, the contents of the associated connect buffer will be used by the local conference circuit to create the conference channels.

When the mode flag is set, the conference circuit will operate in the multinode mode where all connections through the service controller conference circuit will be transparent connections. For transparent connections, the B-CHNL data field and the associated trace and parity bits will be passed through the conference circuit unchanged. In the multinode mode, the conference circuit will use the contents of the least significant 11 bits of the mode select word as an address for reading a B-CHNL from the B-Bus memory 208. The B-CHNL will be transparently connected to the associated outbound channel.

When the mode flag is not set, the conference circuit will operate in the single-node mode where the contents of the eight connect buffer locations following the mode select word will be used to create the required connections. The conference circuit will create the required connection by sequentially reading words two through nine of a connect buffer at the channel time of the associated outbound channel. If the single-channel flag is set in the MSB of word 2, the address encoded in the last significant 11 bits of word 2 will be used to read a channel from the B-Bus memory for a transparent connection in the conference circuit. Transparent connections for single-node systems will be defined in the same way as described above for the multinode mode of operation.

When the single-channel flag is not set in the MSB of connect buffer word 2, the addresses in words two through nine will be used to access channels in the B-Bus memory 208 for summing in the conference circuit. No operation will be executed for connect address words that contain the null code. Within the conference circuit, the B-CHNLs will be converted from μ-Law to linear for summing in the linear domain. After the data has been summed, the resulting linear code will be converted to μ-Law and a B-CHNL will be created to carry the converted code. A parity bit will be generated by the conference circuit for the newly created B-CHNL. The output of the conference circuit will be written into an associated buffer location in the TDM memory under control of the TDM controller. The TDM controller will generate a trace code for the B-CHNL at the time the B-CHNL is written into the outbound buffer of the TDM memory.

As indicated above, B-CHNLs with their parity and trace codes intact will be passed through the conference circuit for single-channel connections, B-CHNLs with new parity and trace codes will be created for conferenced B-CHNLs with the trace codes generated by the TDM controller. Transparent B-CHNLs and conferenced B-CHNLs will be randomly interleaved for single-node systems. Therefore, the TDM controller will require a signal to indicate when a trace code is to be generated. The trace code (when it exists) and a transparent flag will be transported from the conference circuit to the TDM controller 182. The transparent flag will be used to select the code generated by the TDM controller 182 or the code received from the conference circuit for writing to the outbound buffer with the associated B-CHNL.

The contents of locations 2 through 9 of the connect buffers will be transported to the Connect Address Links by the conference circuit for multinode operation. The conference circuit will Read an address from the connect buffer at the channel time of the address on the Connect Address Link. The connect address will then be converted to a serial stream for transport in its designated channel. A parity bit will be generated over the 18 data bits by the conference circuit and transmitted on the Connect Address Link with the connect address signal.

TDM Interface

The TDM interface will provide the service controller interface to the network termination subsystems. The interface is composed of the TDM Multiplexer (MUX) 168, the TDM controller 182, the TDM memory 184, the TDM DSP 162 and the scanner DSP 176. Connections to the network termination subsystems will be via network TDM links 172. The network TDM links 172 will consist of an outbound TDM link, an inbound TDM link and an outbound 8.192 MHZ clock signal. The inbound and outbound links will operate at a rate of 8.192 megabits per second.

The network TDM links 172 will carry network traffic (normally DS0), system framing, a communication channel and other proprietary signals. Network traffic will be carried in 11-bit B-CHNLs. B-CHNLs will be combined with 6-bit Amp Tag fields and 2-bit application-specific fields to form TDM channels. The network TDM links will be organized into 125 microsecond frames. The frame will be partitioned into 32 fields of 32 bits each.

All 32 of the network TDM link fields will carry eight bits of communication data to provide a 2.048 megabit communication link. Nineteen-bit TDM channels will be carried in 31 of the 32 network TDM link fields. The remaining field will be used for frame synchronization. The inbound and outbound links will be symmetrical, except that the Amp Tag field used for the inbound direction will not be required for the outbound direction. The field corresponding to the Amp Tag field will transport control signals to the network termination devices in the outbound direction.

TDM Link Termination

Physical termination of the network TDM links connected to network termination subsystems will be provided at the TDM MUX 168. Potential timing skew on data received on inbound links will preclude direct recovery of the data using the local service controller 20 timebase. An elastic buffer will be provided for retiming the data. A framing pattern generated by devices in the network termination subsystems will be used in the alignment process.

The communication link will be separated from the TDM channel at the TDM MUX 168. The inbound communication link will be connected to the scanner DSP 176 via a serial communication link 177. Data carried in the TDM channels will be written into the TDM memory 184. Inbound TDM channels will contain 19 bits and will carry B-CHNLs, Amp Tag codes and an application-specific field used to pass information, such as PTT indications. B-CHNLs, Amp Tag signals and application-specific signals arriving at the TDM MUX 168 will be converted to a parallel format for transport to the TDM memory 184.

Channel-specific parity test circuits will be provided that will permit parity to be tested on a particular B-CHNL and a particular Amp Tag Code. The test circuits will be used by fault isolation routines running on the processor 150. To execute a parity test, the processor 150 will send a command to the scanner DSP 176 indicating the channel to be tested. The scanner DSP 176 will set up the monitor circuits to monitor the indicated channels and will access status registers associated with the test circuits for monitoring the results of the tests. Results of the tests will be reported to the processor 150. The channel-specific parity monitors will normally be used for fault isolation when parity errors are detected at constant parity monitor circuits provided at signal termination points.

When fault isolation procedures are required for B-CHNL and Amp Tag trace signals, the TDM DSP 162 will test the trace codes. The DSP 162 will Read data received in the specified channel and extract the trace code over the superframe. The received code will be compared with a code transmitted to the TDM DSP 162 at the time the fault isolation routine was initiated.

In the outbound direction, data carried in the TDM channels, the outbound communication link and the control channel, and a synchronization field generated by the TDM MUX 172 will be multiplexed to the outbound network TDM links 172. The control channel will be used by the service controller 20 to control certain functions in the network termination subsystems. The processor 150 will initiate a command by sending a massage to the scanner DSP 176 containing the address of the device to which the command is directed and the code defined for the specific command. The scanner DSP 176 will then write the device address and the command code in TDM MUX 168 registers provided for the purpose. The TDM MUX 168 will then transmit the command to the addressed device.

Outbound TDM channels will carry B-CHNLs and application-specific fields, but will not carry Amp Tag fields. Outbound B-CHNLs with associated trace and parity bits will be transported from the TDM memory 184 to the TDM MUX 168 in a parallel format. Application-specific codes will be written in the TDM memory 184 control buffer by the TDM DSP 162. The codes will be written into the control buffer location associated with the outbound network channel with the address of the data buffer location to be transported in the outbound channel. The application-specific field will be transmitted directly to the TDM MUX 168 at the channel time by the TDM controller 182. The B-CHNLs will be combined with the application-specific field and the resulting outbound TDM channel will be converted to a serial format for transport to the network termination subsystems.

TDM Memory

In the TDM memory 184, the B-CHNL IN buffer will store B-CHNL signals received on the network TDM links 172 and B-CHNLs carrying data signals received from the communications TDM link 166. The Amp Tag IN/application-specific buffer will store Amp Tag signals from both the network TDM links 172 and the communications TDM link 166. Application-specific codes received on the network TDM links 172 will also be stored in the Amp Tag IN/application-specific buffer. The buffer will contain 32 locations for each of the seven network TDM links 172 connected to a service controller and 32 locations for the data signals received from the communication TDM link 166. This organization will permit network TDM links 172 carrying 31 channels (E1) and network TDM links 172 carrying 24 channels (T1) to be readily mixed on one service controller 20.

B-CHNLs carrying DS0 data and the associated Amp Tag codes received on the inbound network TDM links and stored in the TDM memory 184 may be transported to the B-CHNL Link 66 via the B-Link interface 212 or to the TDM DSP 162. B-CHNLs received on the inbound network TDM links 172 that carry LAPD or SS7 signals will be transported to the communication TDM link 166 if the data signals are to be terminated at the receiving service controller 20. If the LAPD or SS7 signals are to be terminated on another service controller 20, the associated B-CHNLs will be transported to the B-CHNL Links 66 with other B-CHNLs received on the inbound network TDM links 172.

Active channels received from the communication TDM link and stored in the TDM memory will be transported to corresponding channels on the outbound network TDM links via the TDM MUX 168 if the associated network termination is connected to the service controller 20, terminating the data signals. The data signals will be connected to a B-CHNL Link 66 for transport to another service controller 20 if the network termination is not connected to the service controller 20 terminating the link.

The transport of data stored in the B-CHNL IN and Amp Tag IN/application-specific buffers that are destined for the B-LINK interface 212, the outbound network TDM link 172 or the communication TDM link 166 will be controlled by the TDM controller 182 as defined in the control buffer. The control buffer will be configured by the processor 150 indirectly through the TDM DSP 162. When the TDM DSP 162 requires access to the buffers, it will access them directly. Application-specific codes will be terminated at the TDM DSP 162 in all cases.

Inbound B-CHNLs read by the TDM DSP 162 will include voice messages to be stored in the DRAM 156 and test codes generated by network termination equipment. When the TDM DSP 162 is storing a voice message, the associated Amp Tag will be used to determine the beginning and the end of the message. The TDM DSP 162 will gain access to the DRAM 156 for storing voice messages through buffer 192 that will connect the TDM DSP 186 to the system bus 174.

Outbound B-CHNLs received from the conference circuit will be loaded into the B-CHNL Out buffer. The buffer will only contain B-CHNL data and associated trace and parity bits. Data in the buffer may be directed to the network termination subsystems via the TDM MUX 168 under control of the TDM controller 182 or the data may be accessed by the TDM DSP 162. The TDM DSP 162 will access the buffer for receiving voice messages or test codes. In some cases, the outbound B-CHNLs may contain LAPD or SS7 signals. If the signals are signals to be terminated on the service controller 20, the signals will be directed to the communication TDM link 166. If the signals are outbound signals to be connected to the network, they will be transported on the associated outbound network TDM link 172.

The TDM DSP B-CHNL buffer and TDM DSP Amp Tag buffer will be used by the TDM DSP to transmit B-CHNLs and Amp Tag channels to the B-CHNL Links 66 for transport to other service controllers 20 or to the network TDM links via the TDM MUX 168. Functions requiring such transmission include the transport of voice messages and the generation test codes for fault detection and fault isolation. The TDM DSP 162 will set up the TDM controller 182 to select channels from the DSP buffer rather than the TDM buffers for channels being transmitted by the TDM DSP 162. The TDM DSP 162 will then load B-CHNLs to be transmitted into the buffer location associated with the allocated B-CHNL Link channel or the selected network TDM channel. The TDM DSP 162 will normally set the Amp Tag field associated with a B-CHNL being transmitted to indicate maximum amplitude.

The TDM control buffer will be used to control the movement of TDM memory data from the TDM memory 184 data buffers to the B-Link interface 212, the network TDM Links 172 and the communication TDM link 166. A location will be provided in the control buffer for each channel associated with the three interfaces listed above. In order to select data from a data buffer for transport to a particular channel on one of the interfaces, the TDM DSP 162 will Write the address of the data to be transported in the control buffer location associated with the interface channel. The TDM controller 182 will Read the address stored in the TDM control buffer at the channel time of the interface and use the address to access the data for transport to that interface channel at the proper time. Outbound application-specific codes will also be stored in the TDM control buffer for direct transport to the TDM MUX 168.

Network Termination Communications Subsystem

The processor 150 will communicate with network termination subsystems for control and status monitoring through the scanner DSP 176. For sending control information to network termination devices, the processor 150 will transport a message to the scanner DSP 176 and the DSP 176 will pass the message to the indicated device via the TDM MUX 168 and the network TDM link 172. For monitoring status, the processor 150 will define scanning sequences for execution by the DSP 176. The DSP 176 will execute the scanning sequences, receive the returned status information and pass it to the processor 150 for interpretation.

Two-megabit-per-second communication links will be used for transporting messages between the processor 150 and the scanner DSP 176 and between the scanner DSP 176 and network termination devices. A single TDM MUX serial link 177 will be provided between the scanner DSP 176 and the TDM MUX 168. Two-megabit-per-second links will be provided for each of network TDM links connecting the TDM MUX 168 to network termination devices. To communicate with a particular device, the TDM MUX serial link 177 will be connected to the network TDM link 172 to which the device is connected. The connection will be accomplished by the scanner DSP 176 by Writing a command to a link select register in the TDM MUX 168 via its parallel bus 178.

To send a message to a network termination device, the processor 150 will send the message to the DSP scanner 168 on the serial communication link connecting the two elements. The DSP scanner 168 will select the appropriate network TDM link 172 and transport the message to the TDM MUX 168. The TDM MUX 168 will multiplex the message data to the selected network TDM link 172 using the COMM channel defined for that link. A CRC code will be generated by the TDM MUX 168 and the code will be appended to the end of the message. At the receiving device, the message will be transported to a DSP residing in a network termination by the TDM interface of that device. The CRC code will be tested at the device TDM interface and a fault indication will be passed to the DSP when a fault is detected. A CRC fault indication will be transmitted back to the processor 150 on the next poll cycle.

When a message received at network termination device indicates that status information should be returned, the required status will be formatted into a message and transported in the communication channel of the inbound network TDM link 172. A circuit in the device TDM interface will generate a CRC code and append the code to the inbound message. The communication channel containing the message will be extracted from the network TDM link 172 at the TDM MUX 168 and sent to the scanner DSP 176. The CRC code will be checked by the TDM MUX 168 and a CRC error flag will be registered in the TDM MUX 168 for access by the scanner DSP 176 when a CRC error is detected. The scanner DSP 176 will send the message to the processor 150. If a CRC error has been registered for the message at the TDM MUX 168, an indication of the error will also be sent to the processor 150.

LAPD and SS7 Terminations

B-CHNLs carrying LAPD and SS7 data may be passed through the CS4 transparently, terminated at the service controller 20 connected to the network termination device carrying the signals, or terminated at another service controller in the CS4. The service controller to which the network termination device is connected will be called the network service controller for the following discussion and the service controller that terminates the data signal will be called the terminating service controller. For transparent transport through the system and for connections between service controllers, the B-CHNLs carrying data signals will be identified as a single-channel connection at the conference circuit. The conference circuit will be capable of passing such data channels through transparently.

When an LAPD or SS7 channel is to be terminated, the data signal will be connected to the communication TDM link for transport to the appropriate QUICC circuit. The communication TDM link will operate at a rate of 2.048 megabits per second and will accommodate 32 B-CHNLs carrying LAPD or SS7 data. A data channel being terminated will be assigned a channel on the communication TDM link.

When the terminating service controller 20 is also the network service controller 20, the connections between the network TDM link and the communication TDM link will be made through the inbound TDM buffer for both the inbound and outbound directions.

Inbound B-CHNLs carrying LAPD or SS7 data will be stored in the inbound TDM buffer as any other B-CHNL. The TDM controller will transport B-CHNLs carrying data signals from the inbound TDM buffer to the TDM MUX 168 at the channel time of the communication TDM link channel assigned to the data signal. The TDM MUX 168 will convert the data from parallel to serial for transmission on the communication TDM link 166. Since the service controller will represent a termination point for the B-CHNL carrying the data signal, parity and trace codes will be continuously monitored for B-CHNLs carrying LAPD or SS7 signals terminating within the service controller 20. The TDM DSP 162 will maintain a buffer of expected trace codes for terminated B-CHNLs carrying LAPD or SS7 signals. The TDM DSP 162 will routinely compare the received codes with the expected codes. Parity and trace codes will not be monitored for Amp Tag channels associated with B-CHNLs carrying LAPD or SS7 signals terminating within the service controller 20, since AMP Tag signals will have no meaning for such B-CHNLs.

B-CHNLs carrying LAPD or SS7 signals terminating at a service controller 20 will be transported from the TDM memory 184 to the processor 150 via the TDM MUX 168 and the communication TDM link 166. Global and channel-specific parity monitors will be provided to monitor parity for B-CHNLs transported to the processor 150. The channel-specific parity monitor will be capable of testing parity on a specific B-CHNL designated by the scanner DSP 176. When a global-parity error is detected, the address of the associated communication TDM channel will be registered with the error indication in the TDM MUX 168. Error indicators generated by the monitor circuit will be accessible to the scanner DSP 176. Channels carrying LAPD data will be directed to QUICC 152 and channels carrying SS7 data will be directed to QUICC 154.

Outbound LAPD and SS7 data generated at the QUICC circuits 152 and 154 will be transmitted to the TDM MUX 168 in assigned communication TDM link channels. The data signals will be converted from serial to parallel at the TDM MUX 168 and parity and trace codes will be generated for B-CHNLs carrying LAPD or SS7 signals. Parity and trace codes will also be generated for the Amp Tag channels associated with the data-carrying B-CHNLs. Fault-coverage signals will be generated for the Amp Tag channels only to assure that all channels received at global test circuits contain valid parity and trace codes.

LAPD or SS7 signals transmitted by the processor 150 will be transported to the TDM memory through TDM MUX 168. A B-CHNL parity generator circuit associated with the communication TDM link will be provided in the TDM MUX 168. Trace codes for the B-CHNLs will be generated by the TDM controller as the B-CHNLs are being written into the TDM memory. The TDM MUX 168 will generate the Amp Tag idle-channel pattern for the Amp Tag buffer locations associated with the B-CHNLs. The idle-channel pattern will contain valid parity and a valid trace code. The idle-channel pattern can be readily generated by hardware since it will be represented by a fixed word value in all frames.

The resulting B-CHNLs and Amp Tag channels will then be written into the appropriate buffer in the TDM memory 184. For the case where the terminating service controller 20 is the same as the network service controller 20, the B-CHNL will be transported from the inbound TDM buffer to the TDM MUX 168 for transport on the outbound network TDM link channel 172 associated with the data signal. The process for transporting B-CHNLs carrying data signals generated at the onboard QUICC circuits 152 and 154 will be the same as for other outbound channels, except that the data will be read from the B-CHNL IN buffer rather than B-CHNL OUT buffer.

When the terminating service controller 20 is not the same as the network service controller 20, B-CHNLs carrying data signals will be transported through the network service controller 20 transparently. Inbound B-CHNLs carrying data signals will be transported to the B-Link interface as any other B-CHNL. Outbound B-CHNLs carrying data signals received on the B-Bus will be passed transparently through the conference circuit to the B-CHNL OUT buffer where they will be processed in the same way as other B-CHNLs.

The terminating service controller 20 that is not the network service controller 20 will operate in the same way as described above regarding the processing of B-CHNLs carrying data signals, with the following exceptions. B-CHNLs transported to the TDM MUX 168 for transmission to the QUICC circuits 152 and 154 will be read from the B-CHNL OUT buffer, rather than the B-CHNL IN buffer. B-CHNLs created at the TDM MUX 168 for transporting data signals from the QUICC circuits 152 and 154 will be written into the B-CHNL IN buffers as described, but the B-CHNLs in the B-CHNL IN buffer will be written to the B-CHNL Link interface 212 for transport to the network service controller 20, rather than being written to the TDM MUX 168 for transport to the network TDM links 172.

PTT Operation

Push-to-talk signals will generally be generated at operator consoles for keying selected radios. The signals may be used for other applications, but the transport mechanisms described herein will still apply. Consoles (not shown) will be connected to service controllers 20 through console interface cards located in high-density application subsystems. Standard DSX T1 spans will be used for connections between the console and the console interface. Network TDM links 172 will be utilized to connect the console interfaces to the service controllers 20.

PTT signals will be transported from the consoles to the console interface cards in dedicated DS0 channels assigned for the purpose. PTT signals transported from the console interface cards to the service controller 20 and PTT signals transported from the service controllers 20 to radio interfaces will be carried in application-specific channels provided in the inbound and outbound network TDM links 172, respectively. The Alternate D-Bus 72 will be used to transport the PTT signals from the service controllers 20 associated with the radios.

For transporting a PTT signal from a console to the console interface, a code will be defined for PTT active and a different code will be defined for PTT inactive. The PTT codes will be transmitted in the DS0 channel assigned on the inbound T1 span. The active code will be transmitted while a PTT button is pressed by an operator. The inactive code will be transmitted while the button is released. The DS0 signals will be terminated at the console interface and PTT signals corresponding to the state of the signal received from the console will be generated in the application-specific channel of the inbound network TDM link 172.

At the service controller 20 receiving the PTT signal, the TDM MUX 168 will place the PTT signal in the Amp Tag IN/application-specific buffer of the TDM memory 184 where it will be scanned by the TDM DSP 162. When a change of state is detected in a PTT signal, the DSP 162 will send a message on the Alternate D-Bus 72 indicating the change of state. The message will be sent to a logical address previously defined to the DSP by the service controller processor 150.

The PTT State Change message will be received by TDM DSP circuits on service controllers enabled to receive the address. The TDM DSP will translate the logical address to one or more physical device addresses (typically radio interfaces) using a translation table defined by the processor 150. The TDM DSP will then appropriately modify the application-specific channel locations associated with the physical addresses in the control buffer of the TDM memory. The TDM controller will then transport the PTT signals to the TDM MUX 168 and the TDM MUX 168 will multiplex the PTT code to the outbound network TDM link channels 172 associated with the addressed devices.

The outbound PTT signals will be received by DSPs not on the service controller on the addressed devices and the devices will execute functions consistent with the application performed by the device.

Voice Record/Playback

Two types of voice messages will be supported in system of the present invention. Canned messages will be used for prompts and voice messages originating in the network will be stored for playback at a later time (Record/Playback). Both types of messages will be stored in the service controller processor DRAM 156 in the initial implementation. Later implementations may provide centralized Record/Play Back storage in order to reduce the cost of applications requiring large amounts of voice storage.

Voice prompts will typically be downloaded into the service controller's DRAM 156 via the Main D-Bus 70.

Messages recorded for playback will be received on B-CHNLs carried by the network TDM links 172. The recorded messages will be loaded into the DRAM 156 by the TDM DSP 162. In general, a voice message recorded on one service controller 20 will be played back at a different service controller 20. For such cases, the messages will be transported from the service controller 20 that recorded the message to the service controller 20 that will play the message back via the Main D-Bus 70.

When a voice message on an inbound B-CHNL is to be recorded, the processor 150 of the service controller 20 to which that channel is connected will inform the TDM DSP 162 that voice data received on the particular channel is to be recorded. The TDM DSP 162 will monitor the Amp Tag field of the channel to determine the start of the message. When the level of the audio as defined by the Amp Tag code crosses above a predetermined threshold, the DSP 162 will start moving data received on the channel into a buffer in the processor's DRAM 156. The TDM DSP 162 will continue monitoring the Amp Tag to determine the end of the message. When the end of the message is detected, the TDM DSP 162 will stop recording and mark the end of the message. The TDM DSP 162 will then inform the processor 150 of the location of the message.

When a voice message is to be moved from one service controller 20 to another, the recording service controller 20 will inform the playback service controller 20 that a message of a given size is to be transferred and the playback service controller 20 will allocate a buffer to receive the message. The recording service controller 20 will segment the message and transport the segments to the playback service controller 20 on the Main D-Bus 70. Low-priority transport will be used to transport voice messages.

Voice prompts or recorded voice messages may be played to outbound network channels associated with the service controller 20 on which the message is stored or to outbound network channels associated with another service controller 20. In either case, the message will be transported by the TDM DSP 162 of service controller 20. The processor 150 will inform the TDM DSP 162 of the location of the message in the DRAM 156 and the channel to which the message is to be played. The TDM DSP 162 will set up the control buffer to transfer data from a location in a transmit buffer located in the TDM memory 184. The control buffer will be set up to transport the data directly on the outbound network channel via the TDM MUX 168 if the network channel is connected to the service controller 20. If the outbound channel is connected to service controller 20, the control buffer will be set up to transport the data to a designated channel on the B-CHNL Link 66 via the B-LINK interface 212 for transport to service controller 20. The connection to the outbound network will then be made at the conference circuit of service controller 20.

Network Termination Control Channel

The service controllers 20 have the capability to send control commands to network termination devices to which they are connected. Bandwidth will be provided on the outbound network TDM links 172 for transmitting the control signals. The service controller processor 150 will initiate a command by sending a message to the scanner DSP 176 containing the address of the device to which the command is directed and the code defined for the specific command. The scanner DSP 176 will then write the device address and the command code in TDM MUX 168 registers provided for the purpose. The TDM MUX 168 will then transmit the command to the addressed device. Functions defined for the control channel include:

1. Reset—The reset command will be used to reset an addressed device to a predetermined condition.
2. Loop-back—The loop-back command will be used to cause the addressed device to loop the outbound TDM link 172 back to the inbound TDM link 172 for the link on which the command is received. The function will be used for fault-detection and fault-isolation procedures, such as qualifying a network TDM link 172 connected to an inactive service controller 20.
3. Remove Loop-back—The remove loop-back command will be used to terminate a loop-back state.
4. Activate link—The activate link command will be used to select the network TDM link 172 on which the command is received as the active link for all outbound and inbound functions. A link will only be deactivated when the mate link is activated so that a specific deactivate command will not be required.
5. Enable-Inbound Link—The enable-inbound link command will be used to enable inbound transmission on the inactive TDM link 172 for an addressed device. Data will normally be transmitted on both copies of the inbound TDM links 172 for 2N-redundant systems, but this procedure will not be permitted, in general, in 1:N-redundant systems. The enable inbound link 172 command will permit selected devices connected to a spare service controller 20 to be enabled for inbound transmission prior to the execution of a switch-over to the spare service controller 20.
6. Disable-Inbound Link—The disable-inbound link command will be used to disable inbound transmission on an inactive link. The command may also be used in fault-isolation routines on either the active or the inactive link. The command will be useful for fault isolating certain network TDM link 172 failure conditions for links where more than one device is connected to the link.

Circuits will be provided on all network termination devices for decoding commands received on the control channel. In one embodiment of the present invention, the command decode circuit will be capable of operating independently of the state of onboard processors or volatile FPGA circuits. In one implementation, the command decode circuit may be dependent on the operation of a volatile FPGA. The circuit will be capable of determining the framing state of the outbound network TDM link (In Frame or Loss of Frame). The reception of a device address in the command code will cause specified circuits to be activated if the link is In Frame. Operation of the reset circuit will be inhibited if the link is in a Loss of Frame state. Sufficient redundancy will be provided in the command codes to assure that the probability of a false detection is vanishingly small in the presence of a $10^{-5}$ bit error rate.

Timing Circuits

Timing signals, including a 16.384 MHz clock and a superframe signal, will be distributed to the service controllers 20 from the A and B node controller 32 and 34 copies. Test circuits will be provided to continuously test the validity of both sets of signals. One copy of the timing signals will be selected as the preferred copy by the active node controller 32 or 34 and that copy will normally be used to generate a local service controller 20 timebase. The timing circuit will be capable of automatically switching to the currently inactive copy of the timing signals. The switch-over will be permitted if the capability has been enabled by the processor 150 and a failure of the currently active timing signals has been detected with no failures being registered for the currently inactive timing signals. Timing signal errors will be registered in the timing circuit interface for access by the service controller processor 150.

The selected timing signals will be used as reference signals to a PLL-based local service controller timebase. The local timebase will be used to time all functions on the service controller 20 and will generate timing for the network TDM links 172. Data being received from the redundant node controllers 32 will be retimed to the local timebase at the backplane interface. Data generated on the service controller 20 using the local timebase will be retimed to the timing signals received from the node controllers 32 or 34 before the data is transmitted to the respective node controllers 32 or 34.

Figure 12:
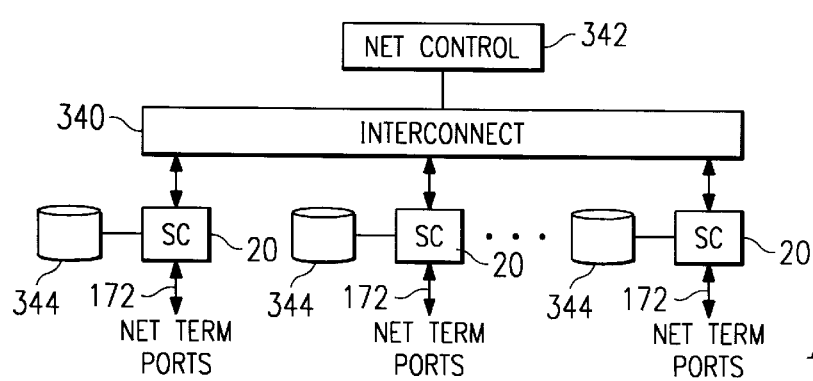
FIG. 12 illustrates a block diagram of the distributed architecture of the present invention.

Referring now to FIG. 12, there is illustrated an overall block diagram of the distributed architecture of the present invention. The overall system can be considered to be a plurality of the service controllers 20 which are interconnected through some type of interconnect 340 for general network. Of course, this interconnect will include in some part the node controllers 32 or 34. The interconnect 340 is controlled by a network control 342 for controlling data flow on the interconnect 340. In general, the distributed system of FIG. 12 represents that there are a plurality of service controllers 20 that each determine the method by which the outbound channel is associated with inbound data. All port data for each service controller 20 is contained within a configuration database 344. Further, each of the service controllers 20 interfaces with its associated network termination ports via the network TDM ports 172. Inbound data, of course, is data that is inbound to the service controller 20 from the network termination ports 172 associated therewith and also from the interconnect layer 340. Since all of the data from all of the network ports is available to each of the service controllers 20, it is only necessary then for the service controllers 20 to determine what data is necessary to provide the appropriate interconnect structure to service its associated network termination ports. By capturing the appropriate inbound data at a particular service controller 20, that service controller 20 can then interconnect its stored data with outbound channels that can be made available to other ports on the network. This is to be compared to a centrally located switching architecture which requires all of the network data to be routed to a central location with the interconnections (or conferences) provided at the central location and then routed to the various nodes. Therefore, each service controller 20 determines how the inbound data thereto is associated with outbound channels therefrom.

Figure 13:
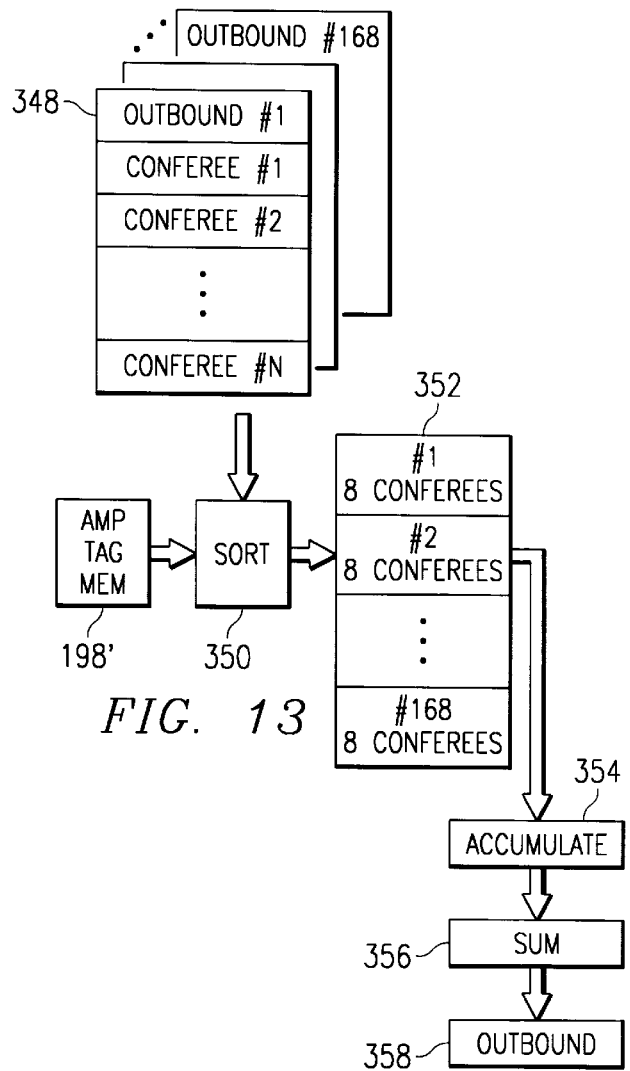
FIG. 13 illustrates a diagrammatic view of the conferencing operation.

Referring now to FIG. 13, there is illustrated a diagrammatic view of the conferencing operation at a particular service controller 20. As noted above, each service controller 20 receives inbound data determined by its particular needs. Although all inbound data is available thereto, only the inbound data that is required for such things as conferences will be stored. As described hereinabove, 170 conferences can be accommodated by each service controller 20. Two of the 170 channels are provided to support maintenance functions. Therefore, there will only be 168 outbound channels for the purpose of conferences. Each of these is defined by a conference list in the conference memory 202. There will be a plurality of lists 348, one for each outbound channel and each list containing the conferees, these being the multinode addresses in the B-Bus memory 208. For each of these lists, the conferees contained therein are input to a sort block 350. The sort block is operable to sort each list in accordance with Amp Tag information stored in the Amp Tag memory 198. This Amp Tag information, as described above, provides amplitude information. It is noted that it is not necessary in a conference to sum into the actual conference output the information received from each conferee, as a large amount of the information is noise. Therefore, the sort operation performed in accordance with the present invention only defines the eight highest amplitude conferees as being the conferees that will be summed. Therefore, the eight conferees having the highest amplitude values will be defined as the eight conferees in a connect list 352. This provides 168 lists, each consisting of eight conferees and each associated with one of the outbound channels. This information is stored in the connect memory 206. The conference circuit 204 will then accumulate the voice information from the B-Bus memory 208 for each conferee in each list, indicated by a block 354. This accumulation will provide a sum, as indicated by a block 356. This will be then transferred to an outbound channel, as indicated by a block 358. This operation will be performed for each of the lists in the block 352. Therefore, by providing 168 connect buffers in the block 352, the conference circuit 204 has the ability to utilize these addresses to address the information in the B-Bus memory 208 for the purpose of summing and creating the required outbound conference channel. This outbound conference channel is then transported to the TDM memory 184 and then to the outbound network channel under control of the TDM controller 182.

There is a special moderator code that is defined for Amp Tags associated with moderators. This will permit conference moderators to be assigned to a particular conference circuit. The Amp Tag sorter 350 will be designed to recognize the moderator codes and ensure that a conference moderator's voice is summed into the conference circuit at all times. As such, one of the eight conferees in the list stored in the connect buffer in the connect memory 206 will by default be the moderator's address. In one embodiment, the moderator override operation will utilize a moderator override algorithm that requires a threshold to assign one of two tags to a channel. If the signal level is below a threshold, then a zero tag is assigned to the channel. If the signal level exceeds the threshold, then a predetermined tag is assigned to the channel. If moderator assigned tags are greater than Amp Tag assignments, then, when a moderator channel becomes active, that channel will participate in the conference.

The sorting operation described hereinabove with respect to FIG. 13 provides a number of advantages. One advantage is the fact that the actual summing operation is performed on less than the total number of conferees in the conference. For example, any one conference has access to all of the available outbound channels. In the present embodiment, there are 2040 outbound channels and the conference could potentially include all 2040 channels in the conference, although any conference would typically exclude the network termination that is associated with the conference. In any event, a conventional conference circuit would typically have to sum all of the individuals in the conference in order to generate the conference output. If this were the case, each storage location of the 2040 outbound channels would be required to have a summation device that could access and sum all 2040 channels (if defined as part of the conference) for each outbound channel to a receiving network termination. If, as in the present embodiment, there are potentially 170 outbound channels associated with a given service controller, which service controller has associated therewith a storage device for storing all 2040 output channels, this would require a single summation circuit to have the capability of summing all 2040 channels for each of the 170 outbound channels and their associated conference (assuming that each conference requires the full set of conferees), which would require an extremely high speed summation circuit. With the embodiment described in the present invention, the sorting function restricts the actual number of "summed" conferees as being limited to eight. Further, this sorting function is a dynamic function that can change as a function of the Amp Tag that is associated with the information on each of the 2040 outbound channels. For example, if amplitude information were to change on one or two of the conferees, the sorting function would change the conferees that were summed in the list 352. With this sorting technique, it is then not necessary to view the information in the storage buffer to effect this sorting operation and, further, the sorting operation is done at the outbound channel rather than at a central location. It is therefore the combination of providing all outbound channels at a given service controller 20 with a sorting function for each outbound channel. This sorting function therefore allows the summing operation to be facilitated with a much slower operation than one that would have to sum all of the conferees in a conference.

Network Termination Subsystems

The three types of Network Termination Subsystems described hereinabove are High Density Subsystems, Low Density Subsystems and Broadband Subsystems. Network terminations that have been defined for High Density Subsystems include T1, E1, BRI and Console terminations. Analog ports are the only terminations currently defined for Low Density Subsystems. Broadband terminations will include DS3 and STS-1 terminations. All of the Network Termination Subsystems will be connected to the Service Subsystems through Network TDM Links 172.

Network TDM Links

The Network TDM Links 172 will provide the transport of network data (typically DS0), system communications and Network Termination Subsystem synchronization. The links will consist of an outbound TDM Link, an inbound TDM Link and an outbound 8.192 MHZ clock signal. The outbound and inbound links will provide a transport rate of 8.192 megabits per second. The links will be organized as 32 Transport Timeslots of 32 bits each within a 125 microsecond frame. The Transport Timeslots will be further divided into Message Channels (MSG), Synchronization Channels and TDM Channels. The organization of the outbound and inbound links is depicted in FIG. 14.

All 32 of the Transport Timeslots of both the inbound and outbound TDM links will carry a 9 bit segment of the MSG Channel. Timeslots 1 through 31 will transmit TDM channels that will carry B-CHNLs and other related data. Timeslot 32 will carry synchronization signals in the field occupied by TDM channels in the other timeslots. The synchronization timeslot of the outbound link will be used to define Frame and Superframe boundaries for the Network Terminations Subsystems. The synchronization timeslot of the inbound link will be used as a position mark for aligning data in the elastic buffers at the service controllers 20. The format used for Transport Timeslots 1 through 31 is indicated n FIG. 15.

A number of bits that will carry information have been defined for both the outbound and inbound links. Fixed ones will be transmitted in the five indicated bit positions of the outbound link to prevent the framing codes from being aliased by data. The fixed ones transmitted on the inbound links will be used to eliminate the effects of bus contention for applications such as BRI and Console terminations where more than one device is connected to a Network TDM link 172.

When more than one device is connected to a Network TDM link 172, a number of TDM channels will be assigned to each device. At a given time, any one of the devices may be transmitting data on the Message Channel. It can be seen that bus contention may exist at the boundary between a TDM channel and a Message channel field for inbound TDM links 172. The bus contention condition will occur when one device is transmitting on a TDM channel, a different device is transmitting on the Message channel and the two devices are not exactly phase aligned. In order to eliminate the adverse effects of such contention, both the TDM channels and the Message channel fields will be bracketed by fixed one bits.

The TDM channels will carry a number of sub-channels. Both the outbound and inbound TDM channels will carry a B-CHNL and an Application Specific field. A control channel will be provided for outbound TDM links and an Amp Tag field will be carried it he inbound TDM link field corresponding the Control Channel field.

Message Channel

MSG channels will provide a 2.048 megabit per second bandwidth for transporting communications between the service controllers 20 and network termination devices. The Message channel segments will consist of a Data Valid flag followed by 8 data bits. A "1" in the Message Data flag will indicate that the following 8 bits contain message data.

The scanner DSP 176 will be connected to the MSG channel at the service controller 20 and similar DSP circuits will be connected to the MSG channels at Network Termination devices. The interface to the MSG channel is described here for the service controller 20 but the description will also apply to circuits at the Network Termination Subsystem end of the MSG channel. The connections between the MSG channel interface (TDM MUX 168) and the DSP 176 are shown in FIG. 16.

Data will be transported between the scanner DSP 176 and the TDM MUX 168 on serial transmission lines. The transport will be synchronized by SYNC signals associated with each data signal. The transmission of data and SYNC signals between the scanner DSP 176 and the TDM MUX 168 in both directions will be timed by the clock signal generated by the TDM MUX 168. The transmission of data bytes on the TX data line will be asynchronous to the transport timeslots of the inbound TDM link 172. When the DSP 176 transmits a data byte to the TDM MUX 168, a SYNC pulse will be generated on the TX SYNC signal one clock prior to the start of the data byte transmission. The eight bits of data on the TX data line following the SYNC pulse will be loaded into a register in the TDM MUX 168 and transmitted to the outbound TDM link 172 on the next available MSG channel segment. MSG channel data bytes received on the inbound TDM link 172 will be transmitted to the scanner DSP 176 using the same format.

The beginning and end of a message transmitted by the scanner DSP 176 will be indicated by a transmit message flag set in the TDM MUX 168 by the DSP 176. A diagram of a typical MSG channel segment sequence is provided in FIG. 17.

Fill codes will be transmitted in MSG channel segments that do not contain MSG data. The transmit message flag will be set to indicate the start of a message. The first byte of the message may actually be transmitted several transport timeslots after the TX MSG flag is set. Fill codes will be transmitted in the MSG segments until the first byte of the message is received from the DSP 176. Once the transport of the message starts, data may be transported in consecutive MSG channel segments or segments containing data may be interleaved with segments containing fill codes depending on the rate of transfer by the DSP 176. The TDM MUX 168 will generate a CRC code over all data bytes following the setting of the TX MSG flag. After the last byte of a message is transmitted by the DSP 176, the TX MSG flag will be cleared. A 6-bit CRC code will be transmitted in the next MSG channel segment following the clearing of the TX MSG flag. The formats for fill, data and CRC codes are indicated in FIG. 18.

A one in the MSG data flag will indicate that the segment contains message data. The fill code will contain a zero in the MSG data flag followed by ones in the 8 data bits. The CRC code will be identified by a zero in the MSG data flag followed by 2 zeros in the first two data bits. The 6 bit CRC code will be transported in the last 6 bits of the data field.

B-CHNL and Application Specific Fields

The B-CHNL will carry 9 data bits, a Trace bit and a parity bit covering the 9 data bits. Referring further to FIG. 15, bits 2 through 9 will normally carry a DS0 signals. Bit 10 is reserved for future applications that may require additional bandwidth. Bit 11 will carry the Trace bit and bit 12 will carry the parity bit.

A two bit Application Specific field will be provided in bits 13 and 14. The field will carry PTT signals in ATC applications. Other requirements for the Application Specific field may be defined in the future. Any application using the field will use it to communicate binary states between the TDM DSP 176 located on the service controllers 20 and Network Termination Interfaces. The remaining 6 bits of the Network TDM links 172 will provide different functions on the outbound and inbound TDM links 172.

Control Channel

In the outbound direction, bit 15 will be used as an anti-aliasing bit and bits 16 through 20 will be used to implement a control channel. The control channel will be used by the service controllers 20 to transport control commands to devices location in the Network Termination Subsystems. The control channel fields of transport timeslots 1 and 2 will carry a 10 bit address used to address particular devices located in the Network Termination Subsystems. The control channel fields of transport timeslots 3 and 4 will be used to encode 10 bit commands that will be sent to addressed devices. To transmit a control command, the scanner DSP 176 will write the device address and the command code in designated registers in the TDM MUX 168. The TDM MUX 168 will then transmit the address and command codes in the designated timeslots. The command will be transmitted on a minimum of 8 consecutive frames.

The command codes will be generated and interpreted in such a way that the probability of misinterpreting a code will approach zero even in the presence of relatively high error rates. The commands will be decoded by hardware circuits in the Network TDM link interfaces of devices connected to the links. Operation of the decoding circuits will be independent of the state of processors that may exist on the receiving devices. An addressed device will react to a received control channel command if the following conditions are met:

1) The command is received in three successive frames.
2) The outbound TDM link 172 is declared to be in-frame for the three frames.

Following is a list of commands that have been defined for devices connected to Network TDM links 172:

1) Reset—The Reset command will be used to reset an addressed device to a predetermined condition.
2) Loop-back—The Loop-back command will be used to cause the addressed device to loop the outbound TDM link 172 back to the inbound TDM link 172 for the link on which the command is received. The function will be used for fault detection and fault isolation procedures such as qualifying a Network TDM link 172 connected to an inactive service controller 20.
3) Remove Loop-back—The Remove Loop-back command will be used to terminate a Loop-back state.
4) Activate Link—The Activate link command will be used to select the Network TDM Link 172 on which the command is received as the active link for all outbound and inbound functions. A link will only be deactivated when the mate link is activated so that a specific deactivate command will not be required.
5) Enable Inbound Link—The Enable Inbound Link command will be used to enable inbound transmission on the inactive TDM link 172 for an addressed device. Data will normally be transmitted on both copies of the inbound TDM links 172 for 2N redundant systems but this procedure will not be permitted, in general, in 1:N redundant systems. The Enable Inbound link command will permit selected devices connected to a spare service controller 20 to be enabled for inbound transmission prior to the execution of a switch over to the spare service controller 20.
6) Disable Inbound Link—the Disable Inbound Link command will be used to disable inbound transmission on an inactive link. The command may also be used in fault isolation routines on either the active or the inactive link. The command will be useful for fault isolation certain Network TDM link 172 failure conditions for links where more than one device is connected to the link.

Amp Tag Field

Figure 19:
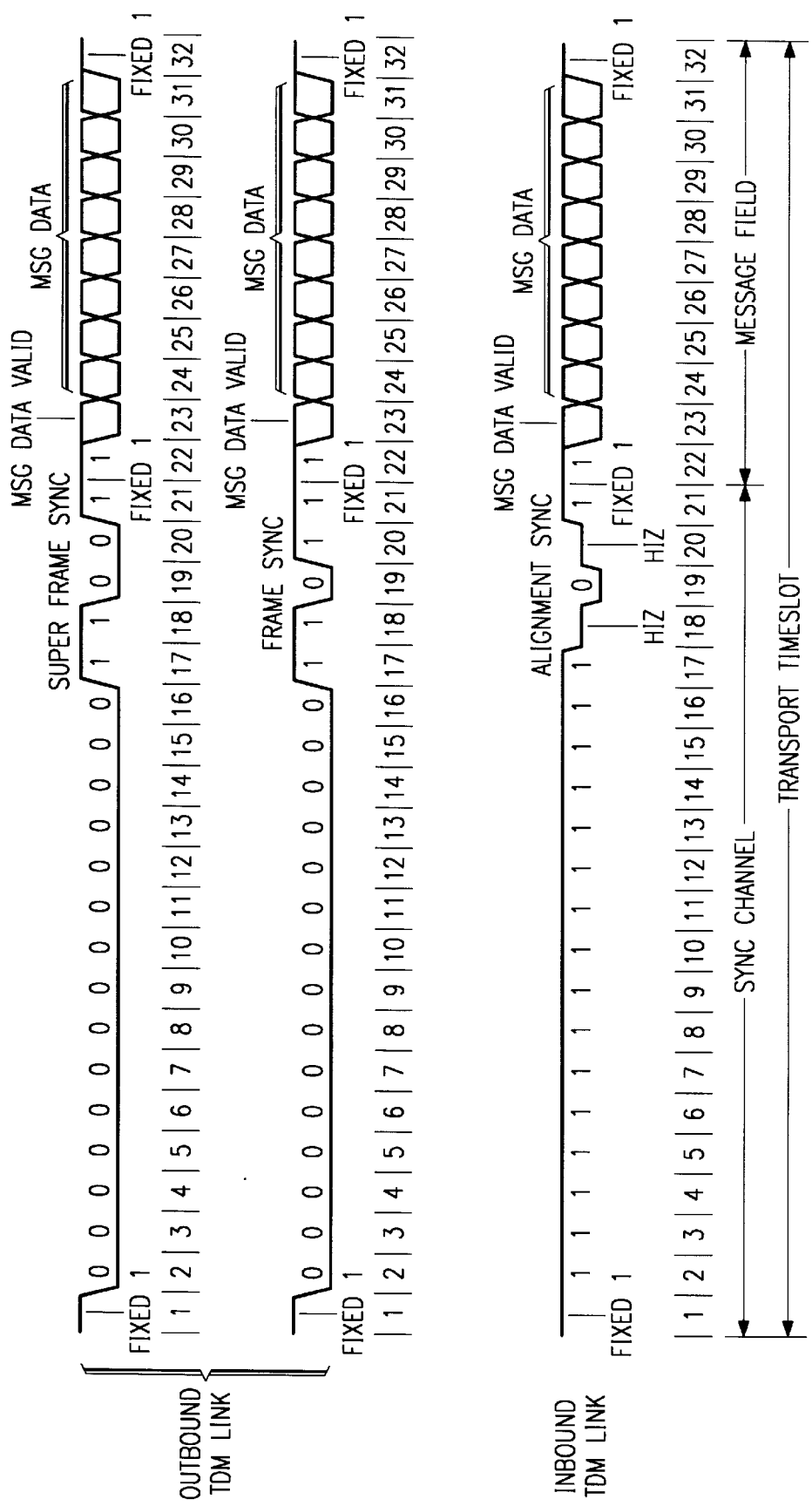
FIG. 19 illustrates the synchronization channel for a network TDM link.

In the outbound direction, bits 15 through 18 of the Transport Timeslots will transport Amp Tag codes that will indicate the current power level of the associated B-CHNL. Bit 19 will provide the Amp Tag Trace bit and a parity bit covering the 4 data bits of the Amp Tag channel will be provided in bit 20. The codes will be generated by DSP 176 circuits located on Network Termination devices. Synchronization Channels The format used for the Synchronization channels is shown in FIG. 19. The field occupied by the TDM channels in transport timeslots 1 through 31 will be replaced with Synchronization (SYNC) codes in the Synchronization channels. As with other transport timeslots, the synchronization code fields and the Message channel field will be bracketed by fixed one bits. One of two synchronization codes will be transmitted in the SYNC field of outbound TDM links. The superframe sync code will be transmitted in every 48th frame and the frank sync code will be transmitted in all other frames. The two codes are defined in FIG. 19. The density of fixed ones in transport timeslots other than the SYNC timeslot will assure that the string of 15 zero bits will not be aliased by a single bit error in other timeslots.

The Alignment SYNC code will be generated on inbound TDM links 172 by devices located in the Network Termination Subsystems. The pattern indicated for bits 16 through 20 will produce a single one to zero transition for use by the alignment circuit in the receiver at the service controller 20. Drivers connected to the link will be in the high impedance state in bits 17 and 19. The high impedance states will assure proper operation in cases where multiple devices connected to a Network TDM link 172 are not exactly in phase.

Multinode System Configuration

Figure 20:
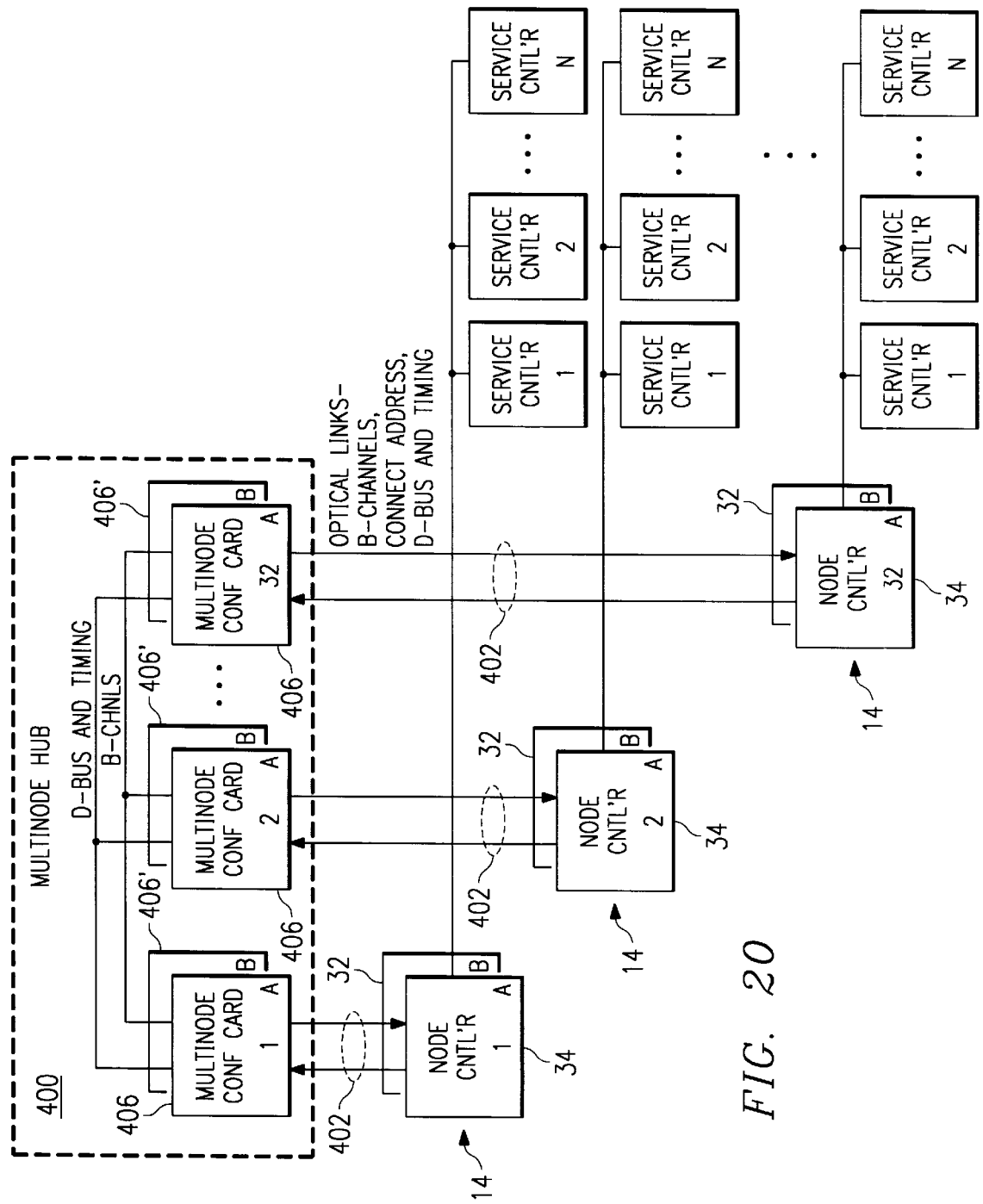
FIG. 20 illustrates a block diagram of a multinode system.

Referring now to FIG. 20, there is illustrated a block diagram of a multinode system. The switching node 14 is designed to permit a growth path to system capacities greater than 2K B-CHNLs. Growth above the 2K capacity will be possible by adding a multinode hub subsystem 400 and connecting 2 or more switching nodes 14 to that subsystem. Two multinode configurations can be utilized. A 16K configuration will support full conferencing capability (480 conferees per conference) for 16K B-CHNLs. A 64K configuration will accommodate 64K B-CHNLs but the number of conferees per conference will be limited to eight. The 64K channel system is illustrated in FIG. 20.

Multinode Configuration

There are provided 32, 2K switching nodes 14 connected to the multinode hub 400 via high speed fiber optic links 402. The optical links 402 will carry B-CHNLs, connect address signals, D-Bus signals, and timing information. Note that Amp Tag signals will not be used with the 64K configuration.

The multinode hub 400 will consist of 32 redundant pairs of multinode conference cards 406, one pair for each switching node 14. The first pair of multinode conference cards 406 will provide network synchronization, system level D-Bus arbitration and system maintenance functions. All of the multinode conference cards 406 will provide conference circuits for the outbound B-CHNLs.

The architecture of the 16K configuration will be the same as that shown for the 64K configuration except that only 8 switching nodes and associated multinode conference circuits will be equipped. The optical links will carry Amp Tag signals as well as the other signals listed for the 64K configuration.

The first pair of multinode conference cards 406 will reside at the top of the system hierarchy for system timing distribution, D-Bus arbitration and system maintenance. Network timing reference signals will terminate at the first pair of multinode conference cards 406 and will be used as a reference for the system timebase. The timebase will be used to time the outbound optical links, and timing signals at the switching nodes will be slaved to timing recovered from those links. System level D-Bus arbitration will be performed by circuits located on the first pair of multinode conference cards 406.

The multinode conference cards 406 will provide B-CHNL switching and conferencing functions for the 2K outbound channels of the associated switching node 14. In multinode systems, conference circuits located on the service controllers 20 will only be used for connecting outbound channels that have been switched/conferenced at the multinode hub 400 to the appropriate network channels. A block diagram of a multinode conference card 406 used in 16K configurations is presented in FIG. 21.

The multinode conference cards 406 interact with circuits located on the service controllers 20 to accomplish the switching/conferencing functions. Each multinode conference card 406 will receive inbound B-CHNLs, associated Amp Tag signals and connect address signals from the switching node 14 to which it is connected.

Received B-CHNLs will be placed on backplane buses 408 for transport to all other conference cards. B-CHNLs from all of the switching nodes 14 will be loaded into B-CHNL memories (4K RAM) on each of the conference cards 406. Since B-CHNLs from all of the switching nodes 14 will be available at each conference card 406, a non-blocking switch can be implemented.

Received inbound Amp Tag signals (not shown in FIG. 21) will also be placed on backplane buses 408 for transport to all other multinode conference cards 406. At each conference card 406, the Amp Tag signals from all connected switching nodes 14 will be multiplexed to an outbound Amp Tag Bus for transport to the associated node 14. Therefore, the outbound Amp Tag Buses will transport 16K Amp Tag signals to each node. Amp Tag signals will not be used on the multinode conference cards 406 but will be transported to all of the service controllers 20 in the system for use in the amplitude sorting function.

Received connect addresses will be used by the receiving multinode conference cards 406 for switching inbound channels to selected outbound channels or to conference a number of inbound channels for connection to selected outbound channels. The received addresses will be stored in connect memories 412 and used to access associated B-CHNLs stored in the B-CHNL memories 410. B-CHNLs read from the B-CHNL memories 410 will be presented to the conference circuits for switching on for summing to create conference channels.

Figure 21:
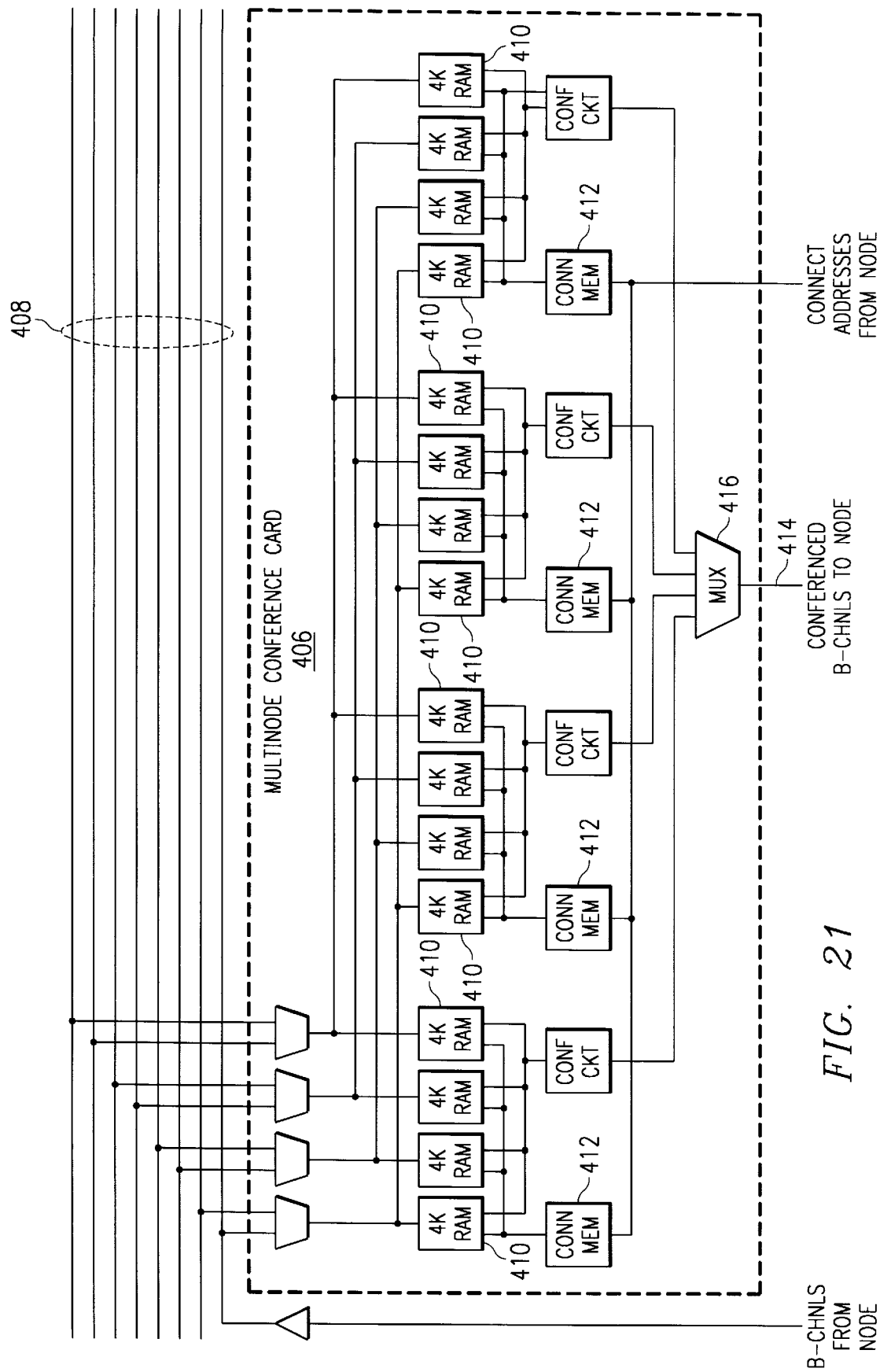
FIG. 21 illustrates a block diagram of a multinode conference card.

As indicated in FIG. 21, four separate conference circuits will be provided on each of the multinode conference cards. Each conference circuit will accommodate 512 outbound B-CHNLs. Not all of the 512 channels will be used for network traffic and will be available for use by maintenance routines. B-CHNLs for the four conference circuits will be multiplexed through a MUX 416 to a 2K outbound B-Bus 414 for transport to the associated switching node.

The multinode conference circuit used with the 64K configuration will be similar to that shown for the 16K configuration. The B-CHNL memory associated with each conference circuit on a 64K conference card will contain 64K words rather than 16K words and the 64K conference card will not transport the Amp Tag Buses.

As discussed above, equipment in the switching nodes 14 will be designed to accommodate growth to a multinode configuration. A list of switching node circuits affected by the growth path is provided as follows:

Amplitude Tag Bus—The Amp Tag Bus 78 will be required to carry an Amp Tag Signal for each B-CHNL supported by a system. The Amp Tag Bus 78 will be designed to carry 16K channels per Amp Tag frame (one millisecond frame period).

Amplitude Tag Memory—The Amp Tag memory 198 located on the service controllers 20 will provide Amp Tag signal storage for each B-CHNL supported by a system. The memory will be sized to support 16K channels.

Connect Address—The addresses of B-CHNLs to be conferenced and the addresses of sorted channels to be connected to a conference will be stored in the conference memory 202 and the connect memory 206, respectively located on the service controllers 20. Also the transport of connect addresses will be a requirement for systems connected to a multinode hub. The range of the addresses provided will be required to uniquely identify each B-CHNL supported by the system.

The conditions listed above indicate that the Amp Tag circuits and transport mechanisms will be designed to support only 16K channels. Amp Tag signals will be used to sort the addresses of conferees to select the 8 to be summed. Therefore, the conferencing capability for systems with capacities greater than 16K will be limited. The memory and transport mechanisms for the connect addresses will be designed to address 64K B-CHNLs. Thus, the design will permit growth to a 64K configuration with limited conference capability. A conference can be provided for all 64K outbound channels but the number of conferees in each conference will be limited to eight.

Figure 22:
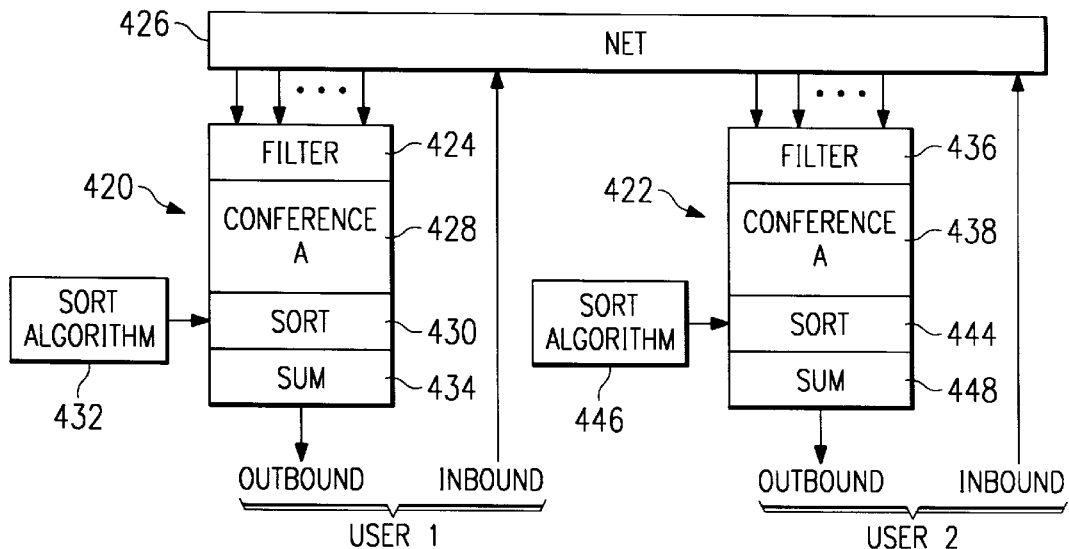
FIG. 22 illustrates a diagrammatic view of a single conference with two users.

Referring now to FIG. 22, there is illustrated a diagrammatic view of two conferences set up on the system. There are two users, a User 1 and a User 2. User 1 is provided with an inbound channel and an outbound channel with the outbound channel being output from a conference circuit 420 and User 2 having an outbound channel and an inbound channel with the outbound channel coming from a conference circuit 422. The conference circuit 420 is comprised of a filter 424 which is operable to receive all outbound channels from the network, referred to by reference numeral 426, which are then filtered down by the conference selection or connect operation which determines the ones of the outbound channels that are to be included in a particular conference. It should be noted, however, that the filter 424 has the option of selecting all of the outbound channels such that all users can participate in the conference. This will result in the creation of a conference A, as represented by a block 428. Conference A represents all individuals in a particular conference. As noted above, each conference is defined by a GCID on the network. This essentially defines, among other things, the outbound channels that are to be included in a particular conference. If another individual enters the conference, they need only access this conference with the GCID and then they will be automatically placed into this particular conference. The system will then send updated information out on the network with this GCID that another conferee has joined the conference and the conferences operating with this GCID will then add the new conferee to their conference. If a conferee drops out, the reverse will occur.

When a particular service controller recognizes that this conference is to be associated with a particular user, then the conference 428 is generated. The conference will then be subjected to a sort algorithm by sort block 430 which operates in accordance with a sort algorithm 432 in order to select ones of the conferees in the conference 428 for output to a sum block 434. It is noted that the sort algorithm will, in the preferred embodiment,.be determined upon the amplitude information associated with the outbound channels. However, the User 1 information that was sent on the inbound channel will typically be sorted out. This is then output on the outbound channel. User 2, which is also indicated as being in conference A, has a similar structure in the conference circuit 422 with a filter 436 for selecting the conferees in the conference and then creating a conference 438, which is identical to the conference 428, both of these being the conference A. This is then subjected to a sort operation in a block 444 for sorting the information in accordance with a sort algorithm 446. In the preferred embodiment, the sort algorithms of block 432 and 446 are the same. However, it is anticipated that different sort algorithms could be utilized for different users for different purposes. For example, it may be desirable to give different levels of priority to certain individuals based upon a particular user's status. One of the examples of this may be that one of the users is a high ranking military official, such as a general. This general may want to give priority to individuals based upon their rank and even exclude certain individuals within the conference, although the conference will include those individuals. The other user, User 1, might be a non-commissioned officer that would listen to the eight conferees having the highest amplitude with priority being given to rank such that if the general were to speak, he would replace the lowest amplitude conferee of the top eight. This sorted information will then be input to a summing block 448 and then provide to the outbound channel for User 2.

Figure 23:
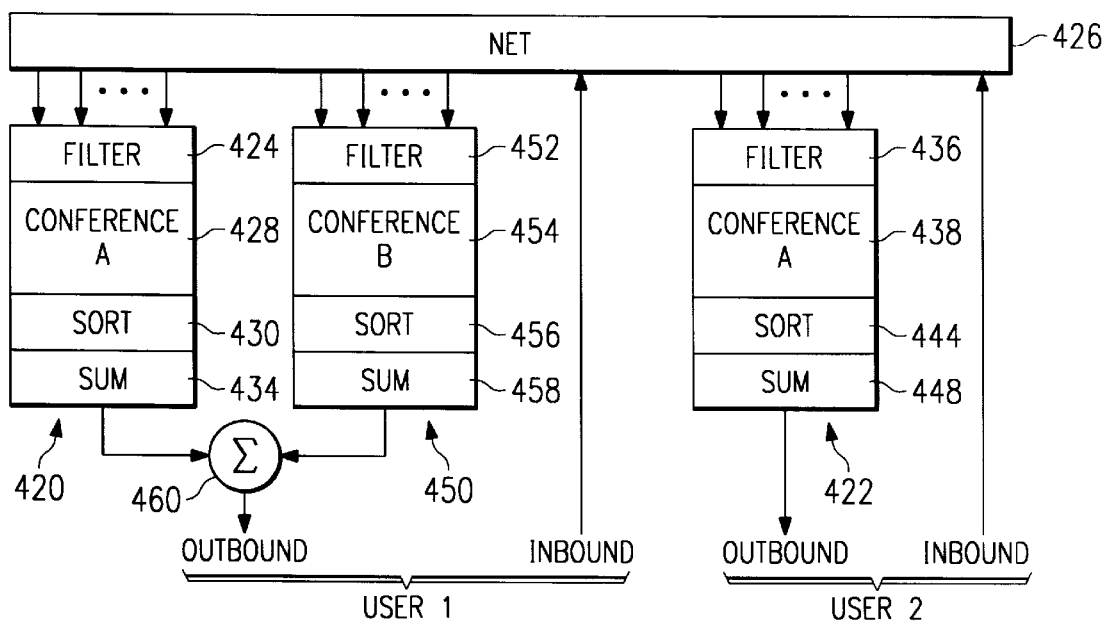
FIG. 23 illustrates a diagram of two separate conferences for two separate users where one user can enter both conferences and one user can enter only one conference.

Referring now to FIG. 23, there is illustrated a block diagram of the system of FIG. 22 with the exception that there are multiple conferences provided, a conference A and a conference B, which can be accessed by User 1. This requires an additional conference circuit 450 to be generated for User 1 in addition to the conference circuit 420. This conference circuit 450 is comprised of a filter 452, a conference block 454 which is operable to be configured with a different set of conferees than the conference blocks 428 and 438 associated with conference A. The output of this would be sorted with a sort block 456 and then summed with a sum block 458. The output of the conference circuit 420 and the conference circuit 450 are input to a summing block 460 to provide the outbound channel information to User 1. It can be seen with this configuration that User 1 can now enter into two conferences, conference A and conference B, and receive information that is not available to User 2, in that User 2 only has access to the output of conference A. It should be noted that the above is illustrative and, in actuality, there is only a single conference table generated for User A with both Conference A and Conference B forming the list of conferees in this single conference.

In summary, there has been provided a distributed digital switching system that is comprised of a plurality of service controllers that are interconnected through a network to each other. The network controls data flow on the interconnecting network between the various service controllers. Each of the service controllers has associated therewith a process for controlling the operation thereof and a database. The service controllers are each connected to network terminations for receiving data in the form of information and messages therefrom and controlling the interconnection of the various network terminations associated therewith to other network terminations in the network. All of the interconnections for a given service controller are defined at that service controller with all information on the network stored at that service controller for the particular operation. Each of the service controllers is operable to utilize its local database to store all outbound information therein. A conference circuit is then operable to create a conference for each network termination associated with the service controller which conference can have as conferees potentially all of the outbound channels stored in the local memory. A summing circuit that is part of the conference circuit is operable to sort the conferees according to a predetermined algorithm and only sum for output to the associated network termination a predetermined number of sorted conferees. This sorting function and conference function are disposed at the service controller associated with the network termination.

Although the preferred embodiment has been described in detail, it should be understood that various changes, substitutions and alterations can be made therein without departing from the spirit and scope of the invention as defined by the appended claims.

What is claimed is:

1. A conferencing system for servicing a plurality of network terminations, comprising:
- a network having a plurality of network channels for carrying network information;
- a network memory associated with each of said network terminations for storing said network information for all of said plurality of network channels;
- a plurality of conference circuits, each associated with a select one of said network terminations, said conference circuits each operable to create a conference for said associated one of said network terminations such that each of the network terminations has a dedicated conference associated therewith, and said conference defining the ones of said network channels that are accessible by said associated network termination in said associated conference;
- a sorter associated with each network termination, and the associated conference, for selecting ones of said accessible network channels defined by said associated conference from said network memory in accordance with an associated sorting algorithm; and
- a summing circuit associated with each of the network terminations for summing the selected ones of said accessible network channels for output to said associated network termination.

2. The conferencing system of claim 1, wherein each of the network terminations has associated therewith an inbound channel and comprising an interconnection for interconnecting said inbound channel to said network, wherein said plurality of network channels for carrying network information comprises the inbound channels from all of the network terminations.

3. The conferencing system of claim 1, wherein said network memory comprises a plurality of network memories, each associated with one of the plurality of network terminations.

4. The conferencing system of claim 3, wherein said plurality of conference circuits is configured such that there is a select one of said conference circuits for each of said network memories for creating conferences for each of the associated network terminations.

5. The conferencing system of claim 1, wherein said network information is voice information.

6. The conferencing system of claim 1, wherein said network information comprises digital data, with digital data from each of the network terminations being digital data that is transmitted in frames with each channel having a time slot within said frame for its associated digital data.

7. The conferencing system of claim 6, wherein said network memory is operable to store each frame of network information for access by said summing circuit.

8. The conferencing system of claim 1, wherein said sorting algorithms are substantially identical for each of the conferences created by said conference circuit.

9. The conferencing system of claim 8, wherein said sorting algorithm utilizes amplitude as a criteria for the associated sorting operation.

10. The conferencing system of claim 9, wherein said network information includes voice information and amplitude information with said amplitude information provided for each of said channels wherein said sorter accesses said amplitude information for sorting thereon.

11. The conferencing system of claim 1, wherein said network information includes voice information and amplitude information with said amplitude information provided for each of said channels constituting the sorting criteria of said sorting algorithm wherein said sorter accesses said amplitude information for sorting thereon.

12. A distributed digital switching system, comprising:
- a network structure for carrying network data flow;
- a plurality of service nodes, each for interfacing with a plurality of associated network terminations for receiving information from said network terminations and transmitting information to said network terminations, and for receiving information from said network structure and transmitting information to said network structure, each of said service nodes including:
  - a network interface for interfacing with said network structure and receiving information from said network structure on inbound network channels and transmitting information to said network structure on outbound network channels,
  - a network termination interface for interfacing with said network terminations associated with said service node for transmitting information thereto on outbound network termination channels and receiving information therefrom on inbound network termination channels,
  - a memory device for storing information associated with select ones of said inbound network channels and said inbound network termination channels,
  - an interconnect network for creating an interconnect structure for select ones of said input channels associated with information stored in said memory for output on an associated interconnect output channel, and
  - a control system for defining the interconnections provided by said interconnect network and the channels for which information is stored in said buffer and for also determining which of said outbound network channels or said outbound network termination channels said interconnect output channel is connected to.

13. The distributed digital switching system of claim 12, wherein said information on said inbound network channel and said inbound network termination channel comprises voice information and message information and wherein said interconnect network is operable to interconnect only said voice information.

14. The distributed digital switching system of claim 12, wherein said interconnect network creates a conference for the one of said inbound network termination channels associated therewith.

15. The distributed digital switching system of claim 12, wherein each of said interconnect structures defined by said interconnect network and said control system have a unique network address associated therewith.

16. A method for conferencing a plurality of network terminations, comprising the steps of:
- transmitting network information through network channels over a network;
- storing the network information transferred over the network in a network memory, the network memory associated with each of the plurality of network terminations;
- providing a plurality of conference circuits, each associated with a select one of the network terminations and creating a conference with the conference circuits for an associated one of the network terminations such that each of the network terminations has a dedicated conference associated therewith, the conference defining the ones of the network channels that are accessible by the associated network termination in the associated conference;

selecting ones of the accessible network channels for each of the network terminations, the selected ones of the accessible network channels defined by the associated conference, from the associated network memory in accordance with an associated sorting algorithm; and summing the selected ones of the accessible network channels for output to the network termination.

17. The method of claim 16, wherein each of the network terminations has associated therewith an inbound channel and further comprising the step of interconnecting the inbound channel to the network, wherein the plurality of network channels for carrying network information comprise the inbound channels from all of the network terminations.

18. The method of claim 16, wherein the network memory includes a plurality of network memories, each associated with a plurality of the network terminations.

19. The method of claim 18, wherein the step of conferencing with the conference circuit includes the step of configuring the conference circuits such that each of the conference circuits is associated with one of the network memories for creating conferences with each of the associated network terminations of the associated network memory.

20. The method of claim 16, wherein the step of routing information over the network includes the step of routing voice information over the network.

21. The method of claim 16, wherein the network information comprises digital data, with digital data from each of the network terminations being digital data that is transmitted in frames with each of the network channels having a time slot within the frame for its associated digital data.

22. The method of claim 21, wherein the step of storing the network information in the network memory is operable to store each frame of network information for access by the step of summing.

23. The method of claim 16, wherein the step of selecting comprises selecting at each of the network terminations with an associated sorting algorithm, of which all of the sorting algorithms are substantially identical for each of the conferences created by the step of conferencing.

24. The method of claim 23, wherein the step of selecting with the sorting algorithm utilizes amplitude as a criteria for the associated selecting operation.

25. The method of claim 24, wherein the network information includes voice information and amplitude information with the amplitude information provided for each of the channels, wherein the step of selecting accesses the amplitude information for performing the selection step.

26. The method of claim 16, wherein the network information includes voice information and amplitude information with the amplitude information provided for each of the network channels constituting the selection criteria of the sorting algorithm and wherein the step of selecting accesses the amplitude information for the step of selecting.

* * * * *